US008080900B2

(12) United States Patent
Corhodzic et al.

(10) Patent No.: US 8,080,900 B2
(45) Date of Patent: Dec. 20, 2011

(54) DIRECT-COUPLED IT LOAD

(75) Inventors: Selver Corhodzic, Santa Clara, CA (US); Andrew B. Carlson, Atherton, CA (US); William H. Whitted, Woodside, CA (US); Montgomery Sykora, Denver, CO (US); Ken Krieger, Jackson, WY (US); William Hamburgen, Palo Alto, CA (US); Donald L. Beaty, Red Bank, NJ (US); Gerald Aigner, Huobstrasse (CH); Jimmy Clidaras, Los Altos, CA (US)

(73) Assignee: Exaflop LLC, Mountain View, CA (US)

( * ) Notice: Subject to any disclaimer, the term of this patent is extended or adjusted under 35 U.S.C. 154(b) by 780 days.

(21) Appl. No.: 11/779,606

(22) Filed: Jul. 18, 2007

(65) Prior Publication Data
US 2009/0021078 A1 Jan. 22, 2009

(51) Int. Cl.
*H02J 9/00* (2006.01)
(52) U.S. Cl. ............................................. 307/66; 307/64
(58) Field of Classification Search .................. None
See application file for complete search history.

(56) References Cited

U.S. PATENT DOCUMENTS

| | | | |
|---|---|---|---|
| 3,757,131 A | 9/1973 | Krutz et al. | |
| 4,809,151 A | 2/1989 | Ota | |
| 5,119,014 A | 6/1992 | Kronberg | |
| 5,458,991 A | 10/1995 | Severinsky | |
| 5,579,522 A | 11/1996 | Christeson et al. | |
| 5,694,307 A | 12/1997 | Murugan | |
| 5,715,154 A | 2/1998 | Rault | |
| 5,789,828 A | 8/1998 | Tremaine et al. | |
| 5,821,636 A | 10/1998 | Baker et al. | |
| 5,844,884 A | 12/1998 | Szlenski | |
| 6,009,177 A | 12/1999 | Sudia | |
| 6,076,142 A * | 6/2000 | Corrington et al. ........... 711/114 |
| 6,157,168 A | 12/2000 | Malik | |

(Continued)

FOREIGN PATENT DOCUMENTS

EP    1 355 404 A    10/2003
(Continued)

OTHER PUBLICATIONS

JP Patent 11-225835 to Kira et al.—english translation, Aug. 24, 1990.*

(Continued)

*Primary Examiner* — Rexford Barnie
*Assistant Examiner* — Justen Fauth
(74) *Attorney, Agent, or Firm* — Fish & Richardson P.C.

(57) ABSTRACT

Apparatus and associated method and computer program products involve a highly efficient uninterruptible power distribution architecture to support modular processing units. As an illustrative example, a modular processing unit includes an integrated uninterruptible power system in which a PFC-boost AC-to-DC conversion occurs between the utility AC grid and the processing circuit (e.g., microprocessor) loads. In an illustrative data center facility, a power distribution architecture includes a modular array of rack-mountable processing units, each of which has processing circuitry to handle network-related processing tasks. Associated with each modular processing unit is an integrated uninterruptible power supply (UPS) to supply operating power to the network processing circuitry. Each UPS includes a battery selectively connectable across a DC bus, and a AC-to-DC rectifier that converts an AC input voltage to a single output voltage on the DC bus. The regulated DC bus voltage may be close to the battery's fully charged voltage.

43 Claims, 11 Drawing Sheets

U.S. PATENT DOCUMENTS

| | | | |
|---|---|---|---|
| 6,225,708 B1 | 5/2001 | Furukawa et al. | |
| 6,289,684 B1 | 9/2001 | Guidry et al. | |
| 6,366,919 B2 | 4/2002 | O Kane et al. | |
| 6,374,627 B1 | 4/2002 | Schumacher et al. | |
| 6,429,706 B1 | 8/2002 | Amin et al. | |
| 6,496,366 B1 | 12/2002 | Coglitore et al. | |
| 6,506,111 B2 | 1/2003 | Sharp et al. | |
| 6,584,559 B1 | 6/2003 | Huh et al. | |
| 6,617,708 B2 | 9/2003 | Boost | |
| 6,652,373 B2 | 11/2003 | Sharp et al. | |
| 6,652,374 B2 | 11/2003 | Sharp et al. | |
| 6,667,891 B2 | 12/2003 | Coglitore et al. | |
| 6,668,565 B1 | 12/2003 | Johnson et al. | |
| 6,741,467 B2 | 5/2004 | Coglitore et al. | |
| 6,768,222 B1 | 7/2004 | Ricks | |
| 6,822,859 B2 | 11/2004 | Coglitore et al. | |
| 6,824,362 B2 | 11/2004 | Dodson | |
| 6,850,408 B1 | 2/2005 | Coglitore et al. | |
| 6,859,366 B2 | 2/2005 | Fink | |
| 6,880,349 B2 | 4/2005 | Johnson et al. | |
| 6,935,130 B2 | 8/2005 | Cheng et al. | |
| 6,937,947 B2 | 8/2005 | Trembley | |
| 6,967,283 B2 | 11/2005 | Rasmussen et al. | |
| 6,969,922 B2 | 11/2005 | Welches et al. | |
| 6,985,357 B2 * | 1/2006 | Cauthron | 361/724 |
| 7,011,576 B2 | 3/2006 | Sharp et al. | |
| 7,123,477 B2 | 10/2006 | Coglitore et al. | |
| 7,145,772 B2 | 12/2006 | Fink | |
| 7,173,821 B2 | 2/2007 | Coglitore | |
| 2003/0133263 A1 | 7/2003 | Shu | |
| 2003/0197428 A1 | 10/2003 | Hatton et al. | |
| 2003/0237008 A1 | 12/2003 | Freevol et al. | |
| 2004/0020224 A1 | 2/2004 | Bash et al. | |
| 2004/0150374 A1 | 8/2004 | Kraus | |
| 2004/0210800 A1 * | 10/2004 | Vecoven et al. | 714/47 |
| 2005/0012395 A1 | 1/2005 | Eckroad et al. | |
| 2005/0036248 A1 | 2/2005 | Klikic et al. | |
| 2005/0088201 A1 | 4/2005 | Devlin et al. | |
| 2005/0099750 A1 | 5/2005 | Takahashi et al. | |
| 2005/0170770 A1 | 8/2005 | Johnson et al. | |
| 2005/0174678 A1 * | 8/2005 | Zayas et al. | 360/73.03 |
| 2005/0182981 A1 | 8/2005 | Hayashi | |
| 2005/0286191 A1 | 12/2005 | Vorenkamp et al. | |
| 2006/0020832 A1 | 1/2006 | Hung | |
| 2006/0082263 A1 | 4/2006 | Rimler et al. | |
| 2006/0187600 A1 | 8/2006 | Brown et al. | |
| 2007/0047195 A1 * | 3/2007 | Merkin et al. | 361/685 |

FOREIGN PATENT DOCUMENTS

| | | |
|---|---|---|
| WO | WO 2007/139577 | 12/2007 |

OTHER PUBLICATIONS

Guralp serial server_UPS unit, Sep. 2005.*

European Examiner Christine Voigt, International Search Report & Written Opinion for Application No. PCT/US2008/070475, dated Jun. 26, 2009, 22 pages.

International Search Report and Written Opinion for International Application PCT/US2006/024880, mailed Feb. 15, 2008, 14 pages.

"Protect High-Density Equipment From Thermal Damage—Guaranteed," APC Currents, vol. 18, No. 4, Sep. 2007, 3 pages.

'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an_pk/3530, 3 pages.

'Intelligent Temperature Monitor and PWM Fan Controller' [online]. Analog Devices, 2003, [retrieved on Oct. 24, 2006]. Retrieved from the Internet: <URL: www.analog.com/ UploadedFiles/Data_Sheets/ADM1030.pdf#xml=http://search.analog.com/search/pdfPainter.aspx?url=http://www.analog.com/UploadedFiles/Data_Sheets/ADM1030.pdf&fterm=Intelligent&fterm=Temperature&fterm=Intelligent Temperature&la=en>, 28 pages.

'LM64-+-1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.

'Low-cost fan manager for power-supply applications' [online]. Electronic Design, 2006, [retrieved on Oct. 23, 2006]. <URL: www.elecdesign.com/Articles/Index.cfm?ArticleID=6281>, 3 pages.

System Management Interface Forum, "PMBus Power System Management Protocol Specification Part 1-General Requirements, Transport and Electrical Interface, Revision 1.0" Mar. 2005, 17 pages.

'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spi2/spi2r20b.pdf >, pp. 181-182.

Cringley, Robert, "Google-Mart: Sam Walton Taught Google More About How to Dominate the Internet Than Microsoft Ever Did," I, Cringely—The Pulpit, Nov. 17, 2005, 3 pages.

Greg Matter Weblog, The Industrial Revolution, Finally, available at: http://blogs.sun.com/Gregp/date/200610, Oct. 17, 2006, 5 pages.

Hamilton, James, "An Architecture for Modular Data Centers" Microsoft Corp,CIDR 2007. 3rd Biennial Conference on Innovative Data Systems Research (CIDR) Jan. 7-10, 2007, Asilomar, California, USA pp. 306-313.

Hamilton, James, "Commodity Data Center Design" Microsoft Corp, Apr. 17, 2007, 11 pgs.

Rackable Systems, "Rackable Systems Contcentro Modular Data Center High Density, High Efficiency Mobile Computing," Datasheet, 2007, 1 page.

Rackable Systems, "Thermal Management & Server Density: Critical Issues for Today's Data Center," White paper, 2004 8 pages.

Sanmina-SCI Product Sheet, ECOBAY, "High-Performance Closed-Loop System," 2006, 2 pages.

Shankland, Stephen, "Sun Blackbox, meet APC's whitebox," cNet News.com, available at http://news.com.com/Sun+Blackbox%2C+meet+APCs+whitebox/2001-1010_3-617774.html, Jan. 7, 2007, 2 pages.

Sun Project Blackbox-Index, Available at: http://www.sun.com/emrkt/blackbox/index.jsp, Retrieved Oct. 19, 2006, 3 pages.

Sun Project Blackbox-Scenarios, Available at: http://www.sun.com/emrkt/blackbox/scenarios.jsp, Retrieved Oct. 19, 2006, 7 pages.

First Office Action for corresponding Chinese Application No. 200680055429.4, mailed May 12, 2010, 16 pages.

Li, C., "Application of Automatic Changeover Switch in UPS Power Supply System," Financial Computing in China, No. 3, 2005, pp. 69-70.

Gu, S., "Distributed Monitoring System of Communication Power Supply," China Master Theses Full-Text Database, Information Technology Series, No. 3, 2003, pp. 7-8.

Notice of Allowance for U.S. Appl. No. 11/756,939, mailed Jan. 29, 2009, 12 pages.

International Search Report and Written Opinion for International Application No. PCT/US2006/039928, mailed Aug. 3, 2007, 8 pages.

International Search Report and Written Opinion for International Application No. PCT/US2006/039715, mailed Nov. 5, 2007, 12 pages.

Non-Final Office Action, U.S. Appl. No. 12/432,567, issued Sep. 21, 2011.

* cited by examiner

DIRECT-COUPLED IT LOAD

TECHNICAL FIELD

The following disclosure relates to electrical power distribution in data centers, for example, techniques and associated apparatus to efficiently deliver uninterruptible power to scalable and/or modular data processing equipment.

BACKGROUND

Electrical power often starts its life pristine—a powerplant generator rotating at a constant speed to produce a smooth, constant-frequency sinusoidal alternating current signal. That signal enters the world as beautiful as a new baby, but it starts aging quickly. Strikes of lightning insert large spikes into the smooth sinusoid. Motors in Industrial equipment feed noise back into an electrical system, interfering even more with the smoothly varying voltage from the power plant. Even household appliances can cause such interference, as one can often hear through stereo equipment.

Audiophiles are not the only people who worry about noise, spikes, and other problems on their power lines. Rather, operators of other electronic equipment, such as computers, also want to have "clean" power to prevent damage to their sensitive gear. This is particularly true for operators of large commercial computer installations such as computer data centers, where thousands or hundreds of thousands of computer servers may be operating. Operators of computer centers also want constant power—no black-outs, no blips, and no sudden re-boots. As a result, such operators may install uninterruptible power supplies (UPS's) that can both condition power (e.g., to return it back to its original smooth, sinusoidal form) and provide some level of battery back-up, either to keep a system operating throughout a power failure, or to give the system enough time to shut down safely and cleanly. In a large computer data center, such a UPS may condition power as it enters the data center, and may condition many megawatts of power.

Large UPS systems suitable for large data centers are expensive to purchase and operate. Such systems can cost millions of dollars to purchase and install. Also, they are less than 100% efficient, and thus take a little power "off the top"—which may be small as a percentage basis, but can be very large for a facility that uses millions of dollars of electricity annually.

SUMMARY

As described with respect to certain implementations in this document, apparatus and associated method and computer program products involve a highly efficient uninterruptible power distribution architecture to support modular processing units. As an illustrative example, a modular processing unit includes an integrated uninterruptible power system in which only one AC-to-DC rectification occurs between the utility AC grid and the processing circuit (e.g., microprocessor) loads.

In an illustrative data center facility, a power distribution architecture includes a modular array of rack-mountable processing units, each of which has processing circuitry to handle network-related processing tasks. Associated with each modular processing unit is an integrated uninterruptible power supply (UPS) to supply operating power to the network processing circuitry. Each UPS includes a battery selectively connectable across a DC bus, and an AC-to-DC rectifier that converts an AC input voltage to a single output voltage on the DC bus. The regulated DC bus voltage may be close to the battery's fully charged voltage. In this manner, a facility may be provided that does not have large central UPS's, but instead has many small distributed UPS's, such as at each tray in a rack-mount computer system, or in a small group of trays.

Some embodiments may provide one or more advantages. For example, a single rectification UPS architecture may substantially reduce complexity and parts count, and may increase expected mean time between failures. In addition, manufacturing flexibility and component procurement and/or volume pricing benefits may be achieved for such a system.

In some embodiments, a modular distributed architecture can facilitate reduced material and/or labor costs for installing, maintaining, and/or replacing data center processing units. Moreover, low cost, light weight, high volume modular processing units with integrated uninterruptible power supplies may be quickly deployed or re-deployed, as needed, in scalable systems or in a wide range of facilities. Some embodiments may also provide hot-swap capabilities.

Various implementations may substantially improve electrical power conversion efficiency, for example, by providing a modular processing unit with an uninterruptible power system in which only a single AC-to-DC rectification occurs between the utility mains and the microprocessor. Improved power conversion efficiency may yield substantial energy savings, which may yield further benefits such as reduced conductor (e.g., copper) requirements and reduced thermal (e.g., air conditioning) loads, for example.

In one implementation, a power distribution system for a data center is disclosed. The system comprises a DC load comprising at least one digital processor operative to process data received over a network, a DC bus configured to deliver operating power to the DC load, the power being received from a power source connected across the DC bus, and an uninterruptible power supply (UPS) integrated with the DC load. The UPS may in turn comprise a battery circuit configured to operatively connect a battery across the DC bus during a fault condition in which an AC input voltage signal falls outside of a normal operating range, wherein the AC input voltage signal originates at a rotating AC generator, an AC-to-DC rectification stage comprising an AC-to-DC conversion circuit configured to receive a substantially unconditioned AC input voltage and convert the AC input voltage signal to a single DC output voltage signal across the DC bus when the AC input voltage signal is within the normal operating range, wherein the AC-to-DC conversion circuit is configured to regulate the DC output voltage signal to a voltage level above and substantially near a maximum nominal charge voltage of the battery, and a controller configured to selectively activate the AC-to-DC conversion circuit to resume supplying operating power to the DC load in response to a signal that indicates that the AC input voltage signal has returned to the normal operating range.

The controller may further control a switch to selectively connect the battery across the DC bus. Also, the battery can comprise one or more cells electrically connected in series or in parallel. The AC input voltage signal can be originated from one or more electric generator types selected from the group consisting of: a generator in an electric utility plant; a gas turbine; a steam turbine; and, a fuel-powered motor-generator. In addition, the AC input voltage signal can comprise a phase voltage signal and a neutral signal from a three phase AC system. The AC input voltage may have an r.m.s. value of about 208 Volts to about 277 Volts, or an r.m.s. value between about 85 Volts and at least about 480 Volts. The AC input voltage can also substantially comprise a sinusoidal waveform at frequency of between about 45 Hz and at least about 500 Hertz. The AC input voltage may also be connected to WYE-connected voltage source.

In some aspects, a cell in the battery comprises a battery chemistry selected from the group consisting of: lead acid; nickel metal hydride; nickel cadmium; alkaline; and, lithium ion. The system can further comprise a charger configured to charge the battery through a path connected across the DC bus. The single DC bus voltage can also be less than about 26 Volts, between about 10 Volts and about 15 Volts, and about 13.65 Volts.

In certain aspects, the AC-to-DC conversion circuit can regulates the DC output voltage signal to approximately 1 Volt above the maximum nominal charge voltage of the battery. Also, the DC bus voltage can provide sufficient voltage for a linear regulator connected in series with the battery across the DC bus to trickle charge the battery to a fully charged state according to battery specifications. The DC bus can, in addition, comprise a first electrical path at a first voltage, and further comprises a second electrical path at a second voltage. Moreover, one of the first and second voltages can be substantially at a ground reference potential. In addition, the system can have only one rectification circuit configured to convert an AC waveform to a DC waveform. A first terminal of the battery also can be configured to connect directly to a first rail of the DC bus, and the second terminal of the battery is selectively connected to a second rail of the DC bus.

In certain other aspects, the system further comprises a data store, wherein the AC-to-DC converter resumes regulating the DC output voltage signal a delay time after the at least one processor receives a signal indicative of the removal of the fault in the AC voltage input signal, said delay time corresponding to a delay time parameter in the data store. The at least one digital processors can determine the stored delay time parameter, and the stored delay time parameter can comprise a pseudo-randomly generated value. In the system, the DC load, the DC bus, and the AC-to-DC rectification stage can be all included on a modular base configured to be supported in one of a plurality of positions on a rack mounting structure, said base for mounting in any available one of a plurality of positions in a rack or frame.

In certain aspects, the DC load comprises at least one member of the group consisting of: a central processing unit; a data storage device; a math coprocessor; and, a digital signal processor. The system can further comprise at least one DC-DC converter configured to convert a voltage supplied on the DC bus to at least one further DC voltage. Also, one or more of the at least one further DC voltage can be approximately the voltage of a member of the group consisting of: −5; 1; 3; 3.3; 5; 7.5; 10; about 18-20; and, about 20-26 Volts. In addition, the one or more of the at least one DC-DC converters can be configured to provide an improved output impedance, and/or to filter noise from the voltage supplied on the DC bus.

In yet other aspects, the AC input voltage signal is originated from one or more sources of electric energy selected from the group consisting of: at least one solar panel; at least one wind turbine; and, at least one flywheel. In addition, the DC load can further comprise one or more information-containing signals transmitted to a load external to the DC load. The system can also include at least 10 instantiations of the DC load connected in parallel to the AC input voltage.

In another implementation, a DC load for use in a data center is disclosed. The load comprises a motherboard including at least one digital processor operative to process data received over a network, a DC bus configured to deliver operating power to the motherboard, the power being received from a power source connected across the DC bus, and an uninterruptible power supply (UPS) integrated with the DC load. The UPS comprises a battery circuit configured to operatively connect a battery across the DC bus during a fault condition in which an AC input voltage signal falls outside of a normal operating range, an AC-to-DC rectification stage comprising a PFC-boost AC-to-DC conversion circuit configured to convert a substantially unconditioned AC input voltage signal to a single DC output voltage signal across the DC bus when the AC input voltage signal is within the normal operating range, wherein the AC-to-DC conversion circuit is configured to regulate the DC output voltage signal to a voltage level above and substantially near a maximum nominal charge voltage of the battery, and a controller configured to selectively activate the AC-to-DC conversion circuit to resume supplying operating power to the DC load in response to a signal that indicates that the AC input voltage signal has returned to the normal operating range.

The load can further comprise at least one point-of-load DC-DC converter on the motherboard, configured to receive DC voltage from the DC bus and provide conditioned DC voltage to an operating circuit on the motherboard. Also, one or more of the at least one point-of-load DC-DC converters can be configured to provide an improved DC output impedance. In addition, the PFC-boost AC-to-DC conversion circuit is of a continuous conduction mode (CCM) type including average current mode control (ACMC), and can be of a critical conduction mode (CRM) type. In certain aspects, the DC load can be connected in a data center further comprising 50 or more of the DC loads connected in parallel to the AC input voltage.

In yet another implementation, a method of providing uninterruptible power to at a motherboard in a data center is disclosed, and comprises connecting a DC bus to supply a single DC voltage to at least one DC load, each DC load comprising at least one digital processor, operating a PFC-boost AC-to-DC converter when an AC input voltage signal from the electric utility grid is within a normal voltage range. The operating step may include converting the AC input voltage signal to a DC voltage on the DC bus, wherein the converting step comprises the only AC-to-DC rectification of electric power generated by the electric utility grid and delivered to the DC load, regulating the converted DC bus voltage to a set point voltage, the set point voltage being substantially close to a voltage in a nominal voltage range for a back-up battery, in response to detecting a fault condition of the AC input voltage signal, connecting a battery circuit directly across the DC bus to enable the back-up battery in the battery circuit to provide operating power to the DC load such that the DC load continues to operate for a period of time after detecting the fault.

The method may also include continuously providing operating power to operate the DC load substantially without interruption for at least 10 seconds. Also, the set point voltage can be substantially close to a nominal fully charged voltage for the back-up battery. The method can also include dynamically selecting the set point voltage based on operating conditions of the back-up battery. In addition, the method can include detecting a fault condition of the AC input voltage signal.

In another implementation, a method of providing uninterruptible power to a substantial portion of motherboards operating in a data center is disclosed. The method comprises connecting a substantially unconditioned AC supply voltage to at least 50 loads, each load comprising a PFC-boost AC-to-DC converter, the converter regulating a converted DC bus voltage to a set point voltage, the set point voltage being substantially close to a voltage in a nominal voltage range for a back-up battery, detecting a fault condition of the AC input voltage signal, in response to detecting a fault condition of the AC input voltage signal, connecting a battery circuit directly across the DC bus to enable the back-up battery in the battery circuit to provide operating power to the DC load such that the DC load continues to operate for a period of time after detecting the fault. In the method, one or more of the at least 50 loads can further comprise a point-of-load DC-DC converter supplying a processor with filtered DC voltage. In some aspects, a one or more of the at least 50 loads further can comprise a point-of-load DC-DC converter supplying a processor with improved-output-impedance DC voltage. Also, the PFC-boost AC-to-DC converter can be of a continuous conduction mode (CCM) type including average current mode control (ACMC), and/or of a critical conduction mode (CRM) type.

In some aspects, the method may also include presenting a combined power factor of the at least 50 loads to the AC supply voltage, the combined power factor being at least 0.95 or at least 0.98, or at least 0.98 leading.

The details of one or more embodiments are set forth in the accompanying drawings and the description below. Other features and advantages will be apparent from the description and drawings, and from the claims.

DETAILED DESCRIPTION

Figure 1A:
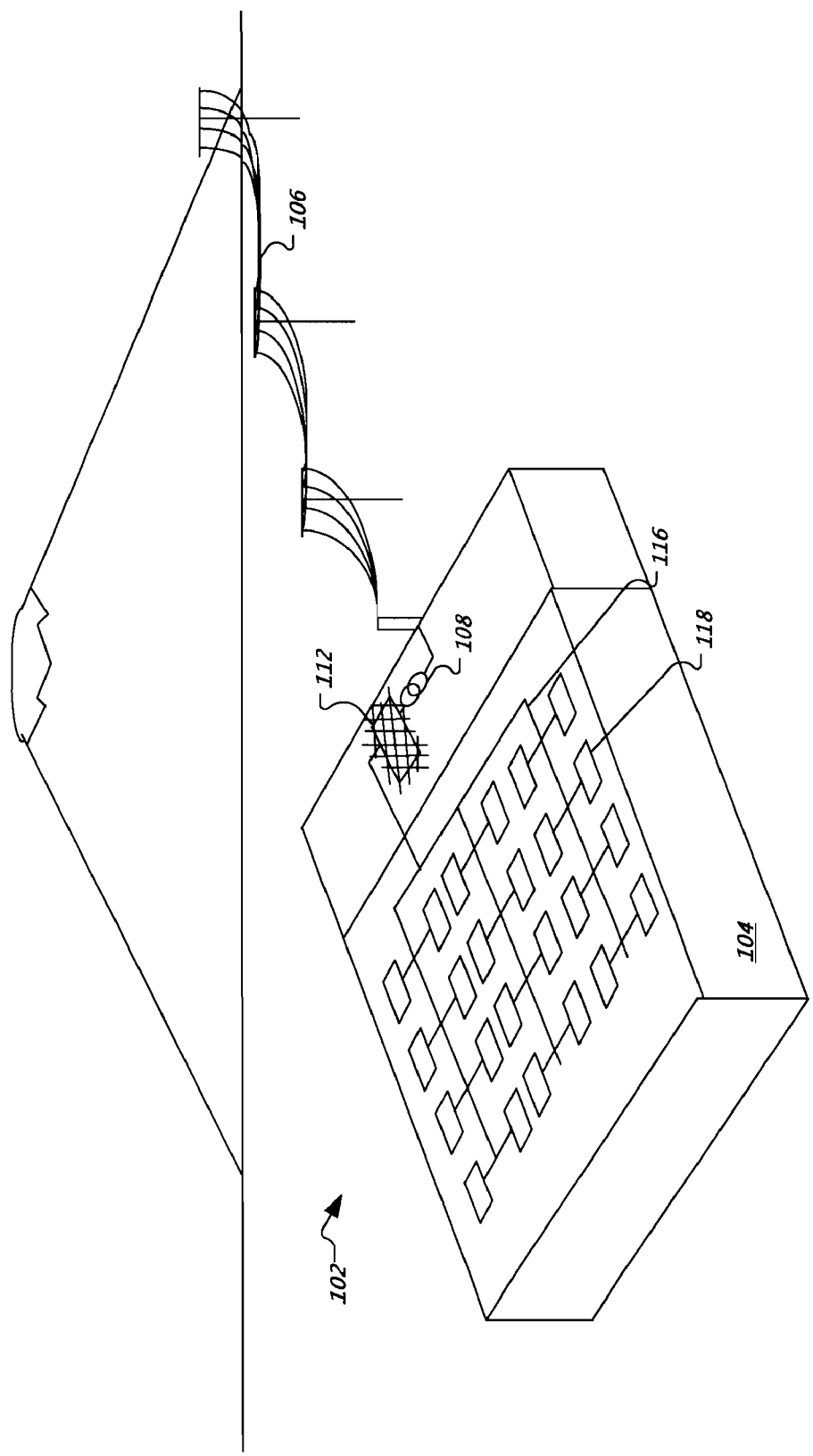
FIG. 1A is a conceptual diagram showing a data center having a number of grid coupled loads.

FIG. 1A is a conceptual diagram showing a data center 104 having a number of grid coupled loads. In the pictured system 102, electricity arrives at the data center 104 from the utility grid 106. Such electricity may be received at 110 KV, and may be stepped down in voltage to 22 KV by transformer 108. Other appropriate voltages may also be received and provided.

In certain general data center systems, the electricity could then be conditioned, and back-up could be provided, by a UPS 112. The UPS 112 would, for example, condition power by removing voltage spikes and voltage sag, adjusting for over-voltage or under-voltage conditions, removing line noise, smoothing out frequency variations, and eliminating switching transients and harmonic distortion. Also, if a power failure were to occur, the UPS 112 may switch the data center 104 from line power to its own power (e.g., batteries) almost instantaneously As shown by cross-hatching in FIG. 1A, however, a central UPS 112 is not used to condition power or provide back-up power to data center 104. Instead, the power proceeds to various loads 118 in the data center 104 without any substantial conditioning. The loads may be connected to the electrical source through a distribution grid 116, which may include a number of bus bars and other electrical distribution equipment.

Each of the loads 118 may include a small group of electronic equipment, such as a computer tray in a computer server rack The loads 118 may each be provided with a local UPS, as described in more detail below, so as to provide for distributed UPS functionality.

Figure 1B:
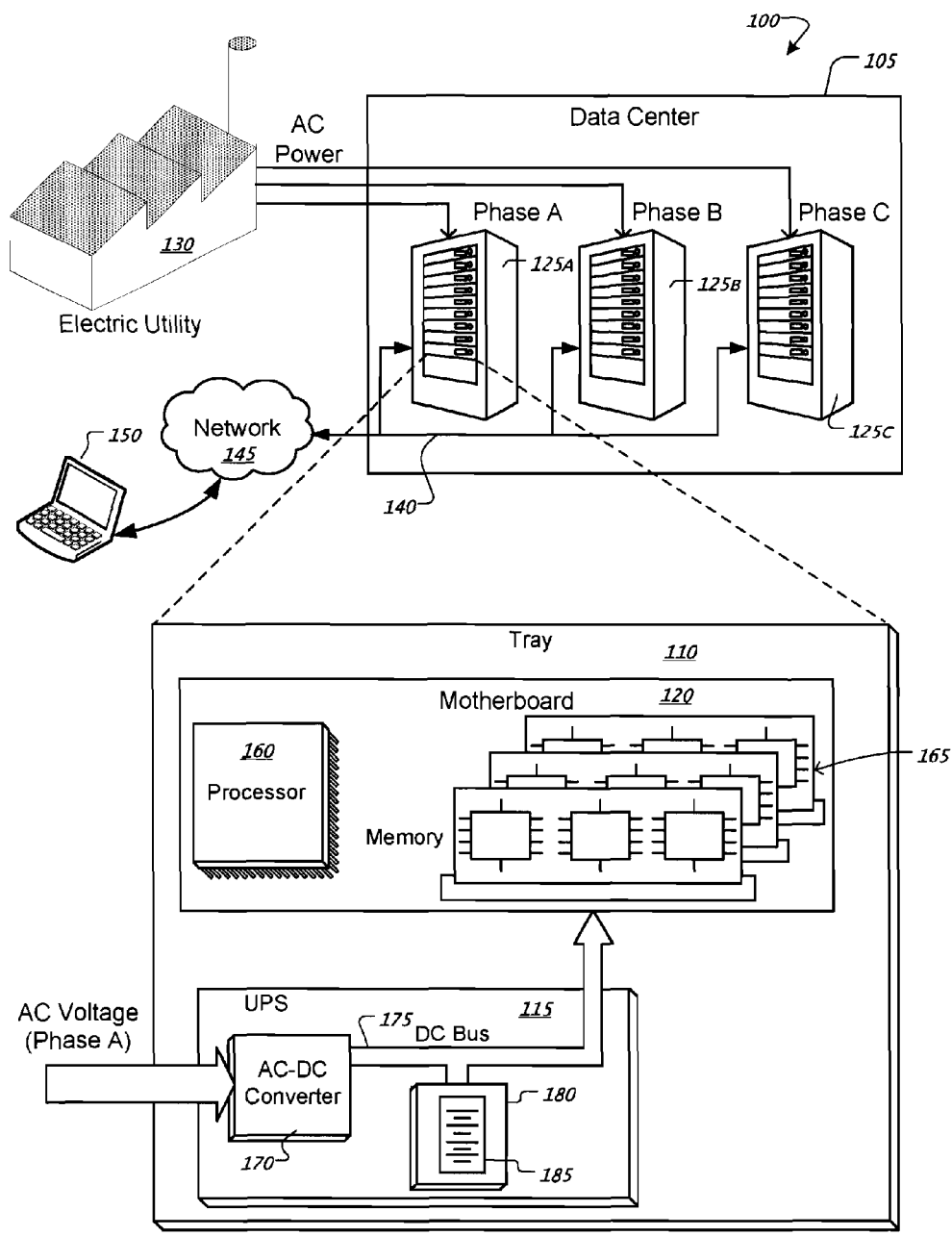
FIGS. 1B-1C are schematic diagrams illustrating exemplary power distribution architectures for a data center in which each of a number of modular rack-mounted trays includes an uninterruptible power supply (UPS) integrated with a computer motherboard.

FIG. 1B is a schematic diagram illustrating an exemplary power distribution architecture 100 for a data center 105 in which each of a number of modular rack-mounted bases (which may also be referred to as trays) 110 includes an uninterruptible power supply (UPS) 115 operating to power components on a computer motherboard 120. Efficient power delivery may be achieved by configuring the UPS 115 (which could be repeated thousands of times throughout the data center 105 at each computer or small group of computers) to perform the only AC-to-DC rectification that occurs between the AC mains power received from the electric utility grid and the DC power consumed by the motherboard 120. In this example, AC mains refers to the AC power source available at the point of use in the data center 105.

When received in the data center 105 at the UPS 115, the AC mains voltage is a substantially sinusoidal AC signal (e.g., 50 Hz, 60 Hz) that was generated, transmitted, and distributed by the electric utility. Such an AC mains voltage may be referred to as "substantially unconditioned," indicating that the AC mains does not have a traditional UPS system or other sort of traditional signal conditioning system with harmonic filtering, noise filtering, or sag protection. Substantially unconditioned AC power may, of course, pass through various circuits typically provided by an electric utility such as, for example, transformers, fuses, and surge protectors such as the typical metal-oxide or silicon-gapped surge arrestors provided by many electric utility providers or large generator systems. The AC mains input voltage is converted to a single DC voltage on a DC bus that delivers operating power to the motherboard 120. In the event of a fault on the AC mains, a battery circuit is electrically connected across the DC bus to supply operating power to the motherboard 120.

In the depicted example, the data center 105 includes a number of racks 125A, 125B, 125C that contain a number of the trays 110. The racks 125A-125C may be powered by three phase AC power that is delivered to the data center 105 from an electric utility 130. The AC power delivered to each of the racks 125A-125C may originate from a rotating generator operated by the electric utility and driven by a steam or gas turbine, for example. The AC voltage signals, which are substantially sinusoidal, may be transmitted to a distribution point, such as a substation (not shown) in the utility grid, for example. The power line voltages (e.g., 480 V line-to-line) may be distributed from the substation to the data center 105.

In the data center 105, individual phase voltages (e.g., 230 or 277 V line-to-neutral) are routed to the individual racks 125A-125C. Suitable AC-to-AC transformers (not shown) may be employed, as necessary, to deliver the AC power at a specified AC voltage. For example, step-down transformers may transform high voltage levels suitable for transmission to lower voltage levels that can be substantially directly applied to the UPS 115. In some three phase configurations, for example, such transformers may make appropriate transformations between WYE and DELTA connections if required.

In some implementations, the AC power signal received by the data center 105 may be substantially unconditioned, containing a low power factor (e.g., a ratio between real power and apparent power) and harmonic components. For example, the electric utility grid may introduce harmonics and noise into the AC power signal. In some implementations, the UPS 115 receives the substantially unconditioned AC power signal to supply the motherboard 120 and/or other DC loads in the tray 110.

Unless otherwise indicated, references to AC voltages are understood to refer to substantially sinusoidal voltages, and voltage amplitudes are understood to refer to root mean square (r.m.s.) values. The utility 130 may deliver substantially symmetric three phase voltages suitable for powering substantially balanced three phase loads.

In the depicted example, one phase voltage and a neutral line are distributed to each rack 125. The racks 125 and trays 110 may be configured to form a substantially balanced load. In other embodiments, a similar distribution may be used if the data center 105 included additional (or fewer) racks 125. As an example, the exemplary tray 110 (shown in magnified detail) in the rack 125A receives a phase A voltage and the neutral line. Each of the trays 110 in the rack 125A receives the same AC input voltage signal, namely the Phase A-to-neutral voltage.

Similarly, each of the trays 110 in the rack 125B receives a Phase B-to-neutral as the AC input voltage signal, and each of the trays 110 in the rack 125C receives Phase C-to-neutral as the AC input voltage signal. In other implementations, different phase voltages may be distributed among the trays 110 in one of the racks 125A-125C, and/or the AC input voltage signal to each of the trays 110 may be line-to-line voltages instead of line-to-neutral voltages. In various embodiments, any practical number of phases (e.g., 1, 2, 3, 4, 5, 6, . . . 12 or more) may be distributed to provide operating power to individual trays 110.

Each of the trays 110 in the depicted example is coupled to a network connection 140. The network connection 140 provides an information channel to a network 145, which may include, for example, a local area network, virtual private network, wide area network (e.g., the Internet), or a combination of such networks, which may be wired, fiber optic, and/or wireless. A remote computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) may facilitate such communication. For example, the exemplary remote computer device 150 may be included in a server, a desktop computer, a laptop computer, and/or a handheld processor-based device. One or more servers may pre- or post-process, supervise, route, and/or balance the flow of data associated with the communication.

In various embodiments, the motherboard 120 may include two, three, four, or any other practicable number of processors 160. In some embodiments, the motherboard 120 may be replaced with or augmented by a tray of data storage devices (e.g., hard disc drives, flash memory, RAM, or any of these or other types of memory in combination). In such embodiments, the UPS 115 with the battery 185 may be integrated with the data storage devices and supported on the tray 110.

In various embodiments, a digital processor may include any combination of analog and/or digital logic circuits, which may be integrated or discrete, and may further include programmable and/or programmed devices that may execute instructions stored in a memory. The memory 165 may include volatile and/or non-volatile memory that may be read and/or written to by the processor 160. The motherboard 120 may further include some or all of a central processor unit(s) (CPU), memory (e.g., cache, non-volatile, flash), and/or disk drives, for example, along with various memories, chip sets, and associated support circuitry.

In some embodiments, the motherboard 120 may provide one or more DC-to-DC converters to convert the DC bus voltage to a suitable voltage for operating the circuitry in the motherboard 120. For example, one or more DC-to-DC converters may provide regulated output voltages, which may include, for example. a +3.3VDC power signal, a +5VDC power signal, a −5VDC power signal, a +12VDC power signal, and a −12VDC power signal.

In an exemplary implementation, the processor 160 and the memory 165 on the motherboard 120 may form at least a part of a processing system configured to handle network operations. As an illustrative example, the motherboard 120 may help to process Internet requests. The motherboard may process information either alone or in combination with other parallel processes running on other processor-based devices, such as one or more other trays 110 in the data center 105.

An AC input voltage signal is delivered to each of the trays 110 to be processed by the UPS 115. In some examples, the AC input voltage signal may be received from the AC mains. The UPS 115 includes an AC-to-DC converter 170 that converts the AC input voltage signal to a regulated DC voltage. The converter 170 outputs the regulated DC voltage onto a DC bus 175. In some embodiments, the AC-to-DC converter 170 may regulate the DC voltage to a static set point. In some other embodiments, the set point may be dynamically determined. In some of the static and dynamic embodiments, the set point may be based on a characteristic of the battery. Examples of such set point regulation will be described in additional detail with reference to FIG. 3.

In some implementations, the AC-to-DC converter 170 may include a power factor correction (PFC) circuit. For example, the AC-to-DC converter 170 may use the PFC circuit to draw AC current that is more closely matched in phase to the AC voltage, thereby improving the power factor of the load. The AC-to-DC converter 170 preferably filters noise from the AC signal, reducing the noise power and allowing the DC circuitry to tolerate harmonic content and noise in the received AC power.

In some examples, the UPS 115 may receive AC power that is substantially unconditioned. For example, the received power may include noise and high harmonic distortion, and the power factor of the received AC power may be substantially less than one. In some implementations, the AC-to-DC converter 170 corrects the power factor of the input power to, for example, greater than 0.97 lagging (e.g., 0.98 leading). In such cases, the collective effect of multiple similar converters 170 provides a collective power factor improvement that is similar.

Using the PFC circuit, the AC-to-DC converter 170 may improve the electrical efficiency of the data center 105. For example, improving the power factor reduces current received by the AC-to-DC converter 170. By reducing the received current, the AC-to-DC converter 170 may reduce power loss and heat generated in the tray 110. Therefore, power efficiency of the data center 105 may be improved. Some examples of the PFC circuit are described with reference to FIGS. 6A-6B.

The system 115 may also prevent harmonics created on equipment 110 from entering the utility network. For example, as noted, each distributed power supply may be provided with a power factor correction controller to perform active power factor correction. Such correction may also control induced total harmonic distortion (ITHD), and may include a complex harmonics filter. Components for performing such activity may include a UCC3818 BiCMOS Power Factor Preregulator from Texas Instruments (Dallas, Tex.). Such features may prevent harmful signals or harmonics from entering the electrical distribution system, both inside and outside a particular facility.

The AC-to-DC converter 170 may maintain voltage regulation on the DC bus 175 when the AC input voltage signal is in a normal range. A normal range for a typical sinusoidal AC signal may be specified in various ways. For example, one or more thresholds may be specified between about 80 V and 500 V for line frequencies that may be between about 40 Hz and 1000 Hz, such as around 50 Hz, 60 Hz, 100 Hz, 120 Hz, 180 Hz, 200 Hz, 300 Hz, 400 Hz, 500 Hz, . . . , and up to about 1000 Hz or more. As an illustrative example, for a 120 V nominal AC input voltage signal, a fault may be identified if the AC peak input voltage falls below a first threshold of 90 V in any half cycle, or if the r.m.s. voltage drops below a second threshold of 100 V for a predetermined amount of time.

Fault conditions may include, without limitation, blackouts, brownouts, voltage sags, surges, instabilities related to switchgear operation, or other electrical transient associated with the AC mains. In some implementations, a fault condition may cause, or potentially cause, improper operation of a processing unit in the DC load, for example, if the AC-to-DC converter 170 is unable to maintain adequate regulation of the voltage on the DC bus 175, and/or to supply sufficient current to operate the DC loads serviced by the DC bus 175.

If the AC input voltage signal falls outside of a normal range, such as during a fault condition, a detection circuit (not shown) may send a signal indicative of this condition. In response to detecting the fault condition, a battery circuit 180 may be configured to connect a battery 185 across the DC bus 175 so that the motherboard 120 can continue to operate substantially without interruption. The battery 185 may continue to provide operating power to the circuits on the motherboard 115 until the battery 185 substantially discharges. The battery circuit 180 may include circuitry capable of controlling the charging and/or discharging the battery across the DC bus 175 in various operating modes. An exemplary battery circuit is described in further detail with reference to FIGS. 5A, 5B.

In some implementations, the data center 105 may include more than 100 trays. For example, the data center 105 may include more than 100 processor cores. In some examples, the data center 105 may execute more than 1000 threads simultaneously. In certain implementations, the data center 105 may include an aggregate of more than 1 terabyte of memory and 1 petabyte of data storage.

In some examples, the data center 105 draws a large amount of power from the electric utility 130. For example, each server system in the data center 105 may consume 100 W-500 W of power. For example, each of the racks 125A-C may consume 2 kW to 30 kW of power. A small data center may provide, for example, 5000 processors, each having one or more cores. As processor technology improves, each processor or core may draw less power, but the number of cores per processor may increase. Larger data centers may employ many more processors, including 10,000, 20,000, 50,000, or even 100,000 processors. These may be distributed in racks having, for example, 20, 30, or 40 processors per rack.

In some implementations, the AC-to-DC converters 170 of the data center 105 is configured to be capable of receiving substantially unconditioned power from the electric utility 130, which would be conditioned by 115 by substantially mitigating noise and harmonic contents. Also, AC-to-DC converters may prevent internally generated harmonic currents from entering utility network 130, as discussed above.

Figure 1C:
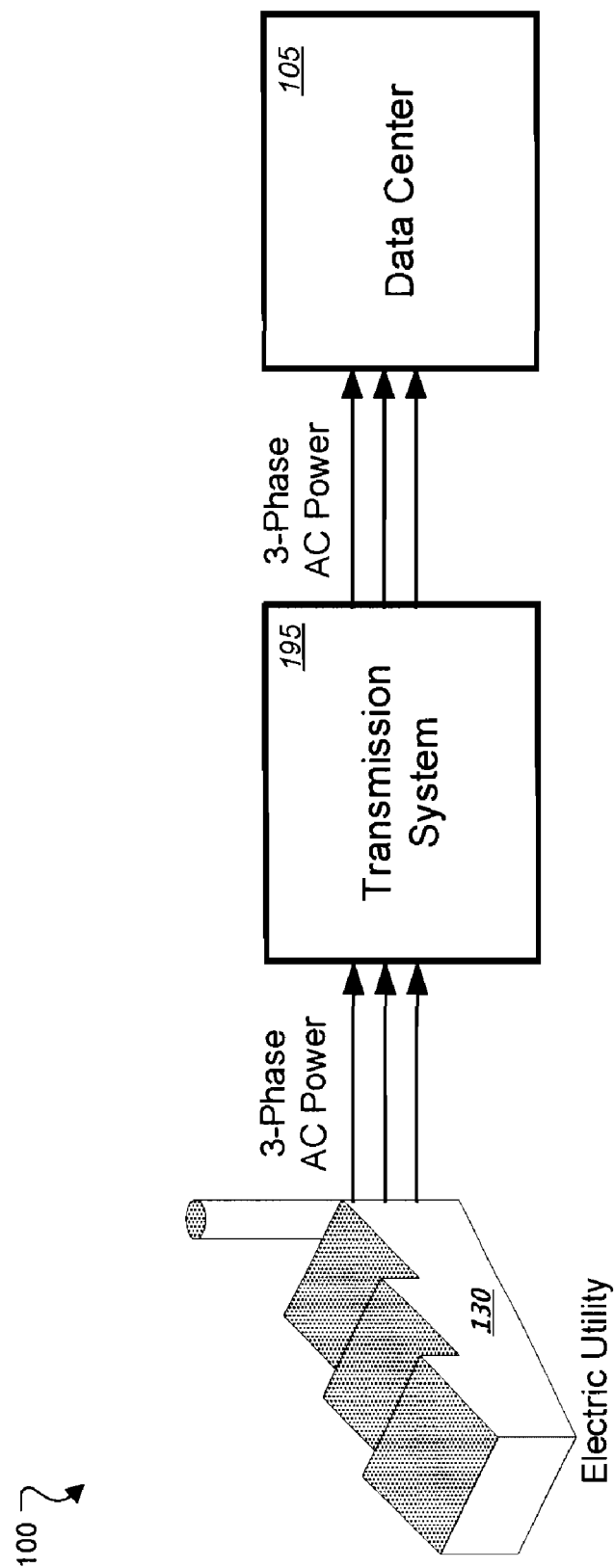

FIG. 1C shows an exemplary power distribution aspect of the architecture 100. As shown in FIG. 1C, the electric utility 130 supplies 3-Phase AC power to the data center 105 via a transmission system 195. For example, the transmission system 195 may include one or more nodes that may be connected to various loads supported by the transmission system 195. For example, the transmission system 195 includes transmission lines that connect the nodes to the electric utility.

The data center 105 operates using unconditioned power from the transmission system 195 and draws current with substantially reduced noise and harmonic contents from the transmission system 195 and improves power factor. For example, the resultant drawn power may have a power factor substantially close to one. Some utilities impose requirements or fees related to data center power factor. For example, a data center may be required to have a power factor over 0.9, 0.95, or 0.97 lagging to achieve certain advantageous pricing. Various embodiments may help achieve such goals by presenting multiple circuits having near-unity power factors to the AC supply, thereby presenting a collective power factor in the desired range. Such collective effect may be achieved, for example, by operating multiple PFC-boost AC-to-DC converters in parallel as described herein.

In some examples, the power factor may be a measure of real power in the delivered power. AC power with a higher power factor (e.g., a power factor closer to unity) may include higher portion of real power that can be used by the data center 105. In some examples, various loads and other structures of the transmission system 195 may introduce noise and harmonic contents that may degrade the power quality and power factor of the delivered AC power. For example, impedance in the transmission lines and the non-linear/intermittent electrical loads at the nodes may deviate the power factor from one and cause harmonic distortion.

In the depicted example, the data center 105 receives unconditioned 3-phase AC power from the transmission system 195. For example, the AC-to-DC converter 170 in the data center 105 may include PFC circuits to improve power efficiency of the data center 105 while using the unconditioned AC power. In some implementations, the data center 105 may draw power from the transmission system 195 with a corrected power factor.

Figure 2:
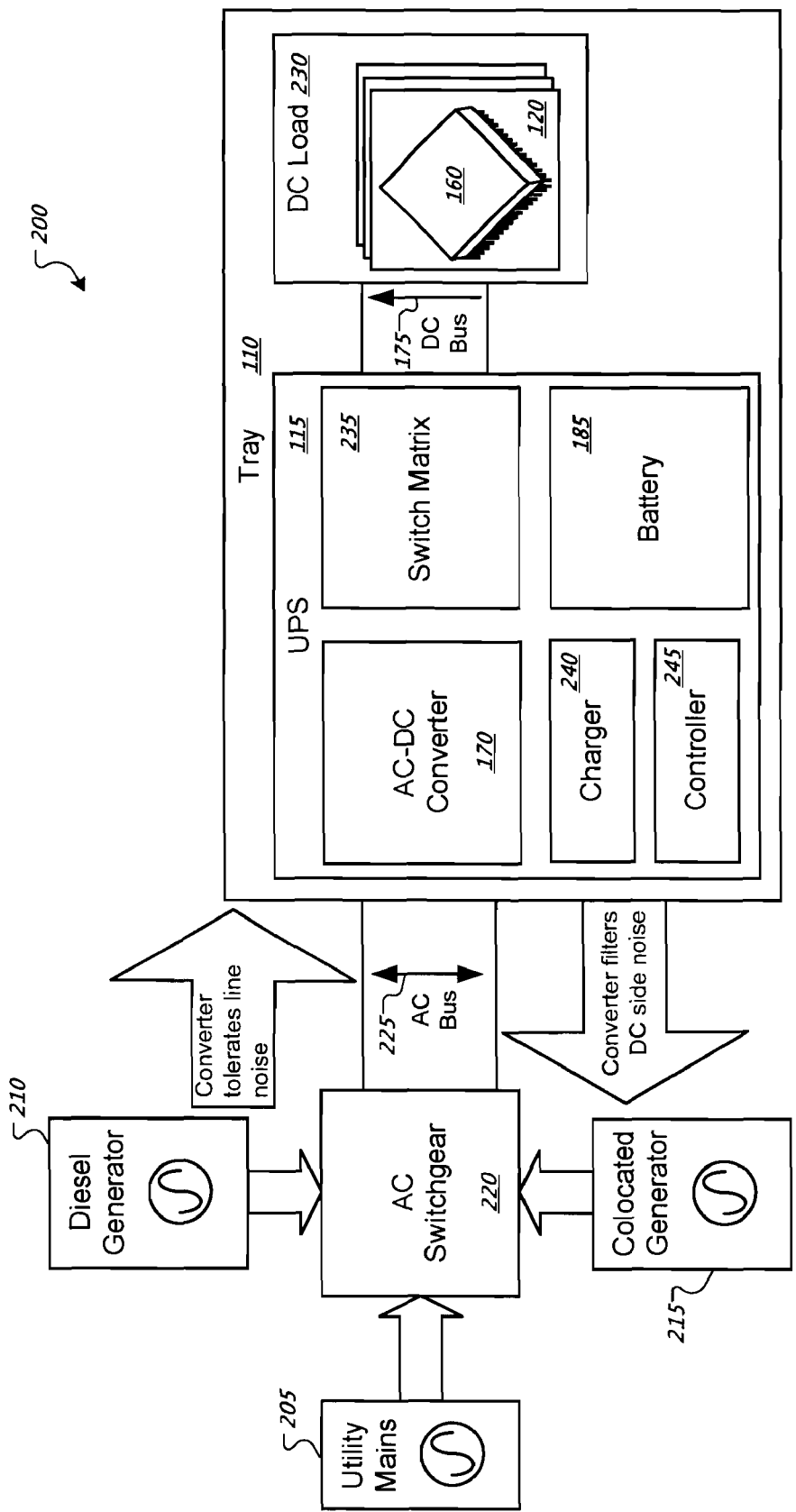
FIGS. 2-4 are block diagrams that illustrate exemplary power distribution architectures for delivering power to operate DC loads that have a processor.
Figure 3:
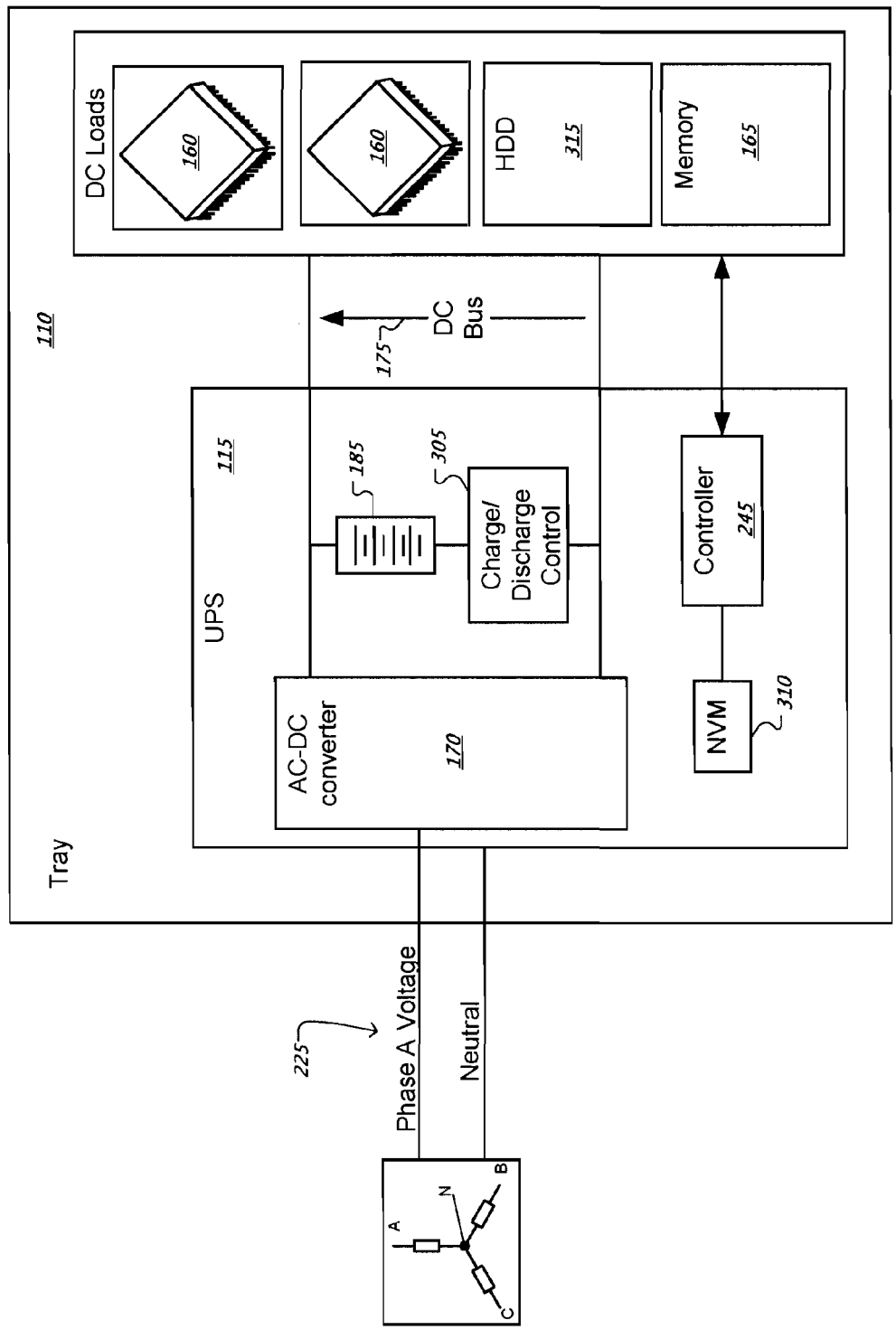
Figure 4:
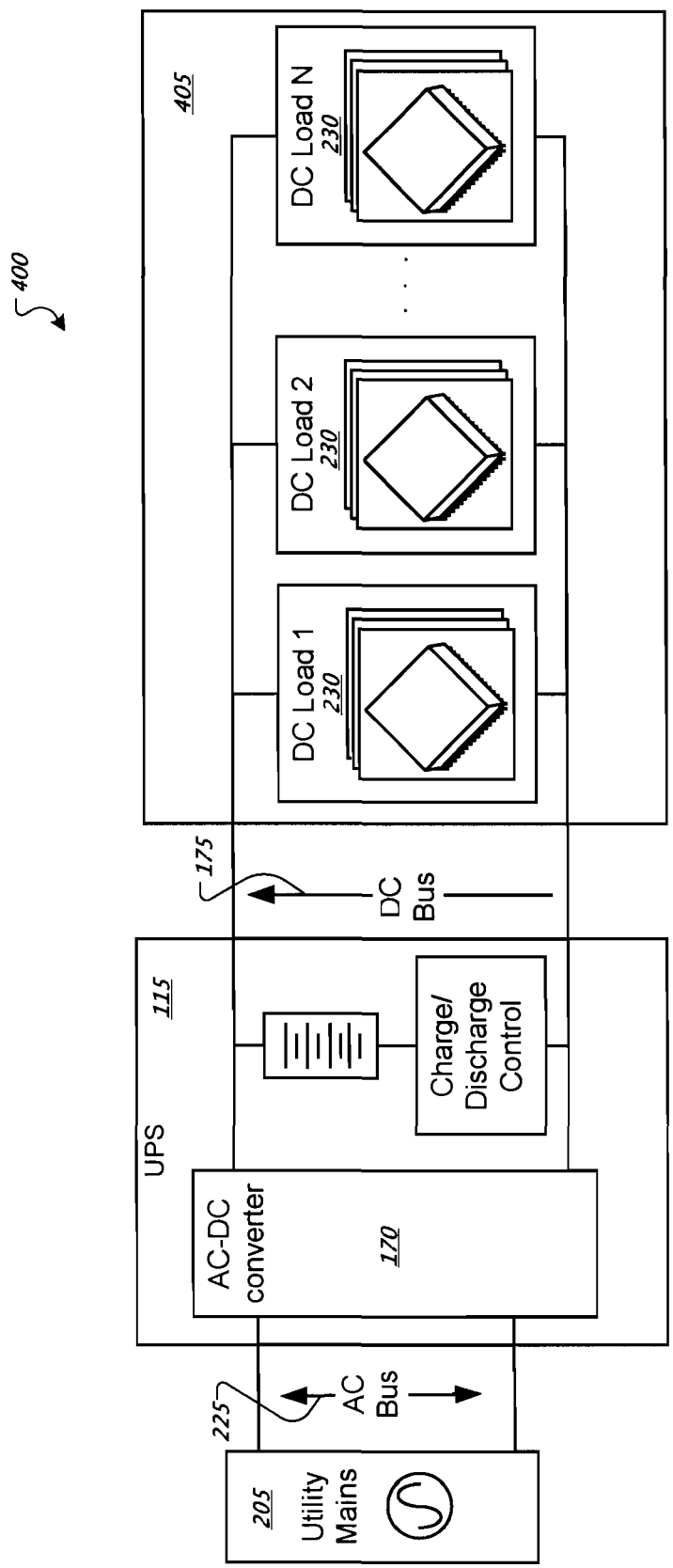

FIGS. 2-4 are block diagrams that illustrate exemplary power distribution architectures for delivering power to operate DC loads that have at least one processor. For example, the motherboard 120 may constitute a DC load in various embodiments. In these examples, the AC-to-DC converter 170 provides the only AC-to-DC rectification that occurs between the AC utility grid (e.g., substation transformer, transmission line, generator, and the like) and the microprocessor 160 in any of the trays 110.

FIG. 2 shows an exemplary power distribution architecture in a system 200, which may be implemented in a large facility with large power requirements, for example. The system 200 includes a utility AC mains generator 205 to supply AC mains voltage from a utility such as the electric utility 130. The exemplary system 200 also includes two back-up AC generators, including a diesel fuel powered generator 210 and a co-located (e.g., gas-fired generator 215). Power from the generators 205, 210, 215 may be combined and/or selected by the AC switchgear 220, and then delivered to the tray 110 via an AC bus 225. In the event of a fault on the AC mains from the generator 205, the generators 210, 215 may provide a backup AC input voltage signal on the AC bus 225.

In some implementations, a substantially asynchronous energy source may be used to generate a substantially sinusoidal AC voltage signal. For example, a flywheel energy storage and recovery system may be used. Wind or solar generated energy, such as that provided by a wind farm or a solar farm, respectively, may serve as sources of energy to generate a substantially sinusoidal AC voltage in an electric utility grid. In such implementations, the generated substantially sinusoidal signal is transmitted through the utility grid to an input of the AC-to-DC converter 170 without intervening AC-to-DC rectification.

In cooperation with the battery backup provided by the battery 185, the generators 205, 210, 215 may provide substantially uninterruptible power to operate a DC load 230 on the tray 110 for short, intermediate, and/or longer term periods.

In some implementations, the AC-to-DC converter 170 is configured to tolerate line noise from the input power from the AC switchgear 220. For example, the tray 110 may receive unconditioned AC power from the utility mains 205, the diesel generator 210, and/or the collocated generator 215. In some implementations, the tray 110 and the data center 105 may operate using the unconditioned AC power. In this example, the UPS 115 uses the unconditioned AC power to supply the DC load 230. In certain implementations, the AC-to-DC converter 170 includes a PFC circuit to increase the power factor of the power signal supplied to the DC loads 230. As shown, the AC-to-DC converter 170 filters DC side noise from the return power signals to the AC switchgear 220. For example, the returned harmonic currents (flowing from the data center 105 to the electric utility grid) may include a significantly reduced amount of noise and harmonic contents. In some examples, a cost for building the data center 105 may be reduced by configuring the tray 110 to tolerate line noise from the input AC power.

An exemplary use of the generators 210, 215, may be illustrated in the event of a fault (e.g., brownout, blackout) or unavailability (e.g., circuit maintenance) of the AC mains voltage from the generator 205. In response to detecting the fault on the AC input voltage signal, the battery 185 is connected to deliver substantially battery voltage across the DC bus 175. As such, short term (e.g., at least 10, 20, 30, 40, 50, 60 seconds at full load) operation of the DC load is maintained by power supplied from the battery 185. The diesel generator 210 may be started to provide power to the AC bus 225, preferably before the battery 185 fully discharges. For more extended AC power faults, the co-located generator 215 may be brought on-line to provide a more cost-effective operation, or to avoid exceeding government-regulated limits on diesel fuel generation.

In some implementations, one or both of the generators 210, 215 may provide peak load shedding capability. For example, the co-located generator 215 may be used during expected peak demand hours each day. In some cases, this may permit negotiation of preferential rates for electric power from the electric utility 130.

FIG. 3 shows an exemplary schematic in additional detail. In various embodiments, the AC-to-DC converter 170 may regulate the single output voltage on the DC bus to a set point. The set point may be a static value in some embodiments, or it may be dynamically determined during operation. For example, the set point may be based, at least in part, on one or more electrical characteristics of the battery.

Characteristics on which a set point can be established may include battery characteristics such as battery chemistry, battery age, charge/discharge history, nominal maximum charge, temperature, charging profile (e.g., voltage charge rate under constant current), estimates of battery internal impedance, or other parameters relating to the electrical performance of the battery.

In addition to internal battery characteristics, the set point may be based at least in part on electrical circuit parameters of the battery circuit 180 and the DC bus 175. In some embodiments, the set point to which the AC-to-DC converter 170 regulates the voltage on the DC bus 175 can be a function of a battery charging circuit topology. If the battery charging circuit provides a voltage boost circuit (e.g., boost converter, charge pump, flyback), then the set point voltage may be substantially at or below a desired maximum charge voltage. If the battery charging circuit only provides a voltage step-down (e.g., linear regulator, buck converter) capability, then the set point can be set to a value sufficiently above the maximum nominal charge voltage to achieve the required charge performance over relevant temperatures, taking account of tradeoffs in power loss and charging current and corresponding charge time. In light of such trade-offs, the set point may be only as high as necessary to meet charge time specifications. For example, the set point may be set to between about 0.050 and about 1 Volt above the nominal expected battery voltage.

In various embodiments, the set point voltage may be set based on a specified temperature, such as 0, 10, 25, 30, 40, 50, ..., 80 degrees Celsius. In an illustrative example, the set point may be dynamically adjusted based on a temperature in or around the battery 185 as measured by at least one temperature sensor (not shown).

In the depicted embodiment, the UPS 115 includes a charge/discharge control circuit 305 in series connection with the battery 185, and further includes the controller 245 in operative connection with a non-volatile memory (NVM) 310.

The series connected battery 185 and circuit 305 are connected across the DC bus 175. Responsive to a signal indicative of a fault on the AC input voltage signal, the circuit 305 can operatively connect the battery 185 across the DC bus 175 to permit the battery to discharge to the DC load 230 through a low impedance path. When the AC input voltage signal on the AC bus 225 is not faulted, the circuit 305 may selectively permit charging current to flow from the DC bus 175 to charge the battery 185. If multiple batteries or battery strings are connected in electrical parallel, individual strings or groups of strings may be independently charged at different rates according to a defined charging algorithm.

In the depicted embodiment, the NVM 310 may store set point information for regulating the output of the AC-to-DC converter 170. The set point information may be stored during manufacturing time, upon first use, and/or dynamically updated during operation of the tray 110. The controller 245 and/or the AC-to-DC converter 170 may read and/or use the stored set point information to determine how to control the AC-to-DC converter 170. In addition to set point information, information about threshold conditions for switching over between AC input and battery operation may be stored in the NVM 310, for example.

Access to information stored in the NVM 310 may be provided through a serial or parallel interface (which may have a wired and/or infrared physical layer), for example, between the NVM 310 and one or more processors 160 on the DC load 230. The processors 160 may be used to access and/or update information in the NVM 310 via the network connections 140 (FIG. 1B) to each tray 110.

Additional data storage devices may be provided on the DC load 230. In the depicted example, the DC load 230 includes two processors 160 in operative connection with the memory 165 and a hard disc drive (HDD) 315.

FIG. 4 illustrates an exemplary power distribution architecture 400 on the rack 125. In the architecture 400, the UPS 115 delivers power through the DC bus 175 to multiple DC loads 230 in a processing unit 405. Each DC load 230 is connected in parallel across the DC bus 175. Power delivered to the DC loads 230 is rectified from AC-to-DC only one time between the utility mains 205 and the DC load 230. In one embodiment, a processing unit 405 includes an array of disks, an interconnect card, and an uninterruptible power supply with a battery.

In various implementations, each DC load 230 may have similar circuits or different circuits. Various ones of the DC loads may provide primarily data storage, data processing, data communication, or a combination of these or other functions. In one embodiment, the DC loads 230 are located on multiple trays in the rack 125. In another embodiment, the entire processing unit 405 is located on one of the trays 110. In some embodiments, the UPS 115 is integrated on a single tray 110 with the processing unit 110. In other embodiments, the UPS 115 may be located elsewhere on the rack 125. Processing unit 405 may refer to a one or more trays, racks, or other structure containing one or more DC loads 230, which structure may include at least one bay, cabinet, portable or stationary building, or an entire facility, such as the data center 105, for example.

Various implementations may also supply multiple DC voltages, which may be isolated from each other, to various loads. The voltage may be similar or different. For example, 12V, 5V, 3.3V or less, and −12V DC voltages may be supplied. These voltages may be provided by an AC-to-DC converter 170 configured to provide multiple DC voltages. Further, varying DC voltages may be supplied to loads by further DC-to-DC converters, often called "point-of-load" converters, placed between AC-to-DC converter 170 and their particular DC-consuming load.

Such converters often provide further noise filtering for noise-sensitive DC circuits. They also may provide improved output impedance for loads that have high instantaneous current variation. For example, a processor may run at 2.7V, 3.3V, or other voltages, and may switch from a low current to a high current very quickly. Such a fast transition might ripple the output voltage in some designs of an AC-to-DC converter 170. Point of load voltage converters help provide low impedance voltage that does not vary greatly with the load drawn. Point-of-load converters may be integrated with depicted DC loads 230, for example, or may be positioned near such loads on motherboards 120. Lower output impedance point of load converters are typically more expensive than higher impedance converters, and so output impedance of point-of-load converters is typically sized according to the requirements of each DC load. For example, a processor may require a low-output-impedance point-of-load converter while a bus controller or a fan may be configured with a cheaper, higher output impedance point-of-load converter.

Figure 5A:
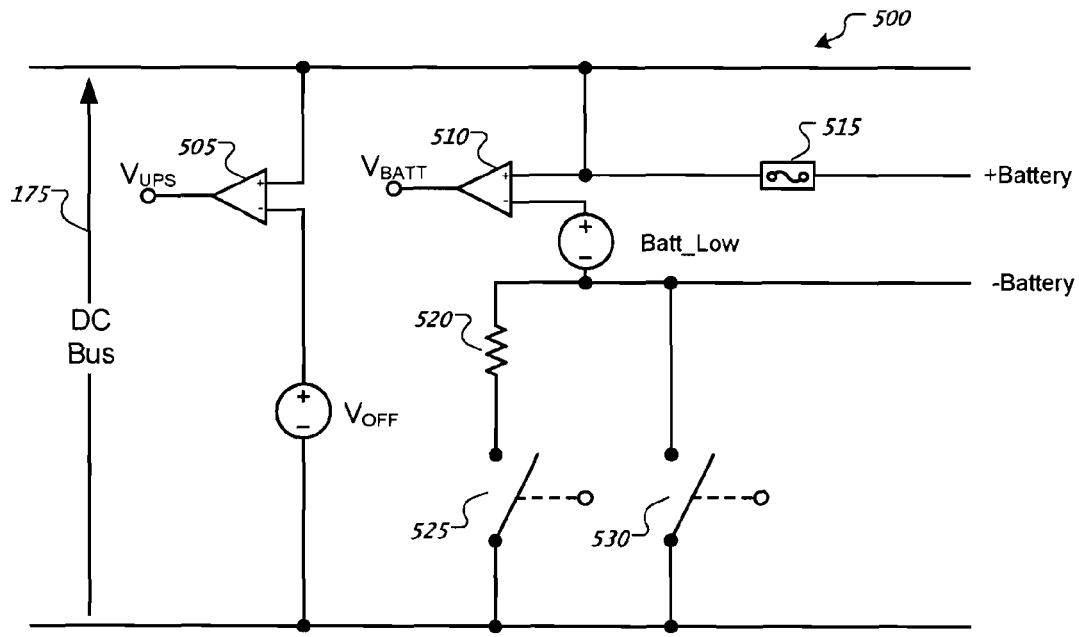
FIGS. 5A-5B are schematic diagrams showing details of a battery circuit in an exemplary power distribution architecture.
Figure 5B:
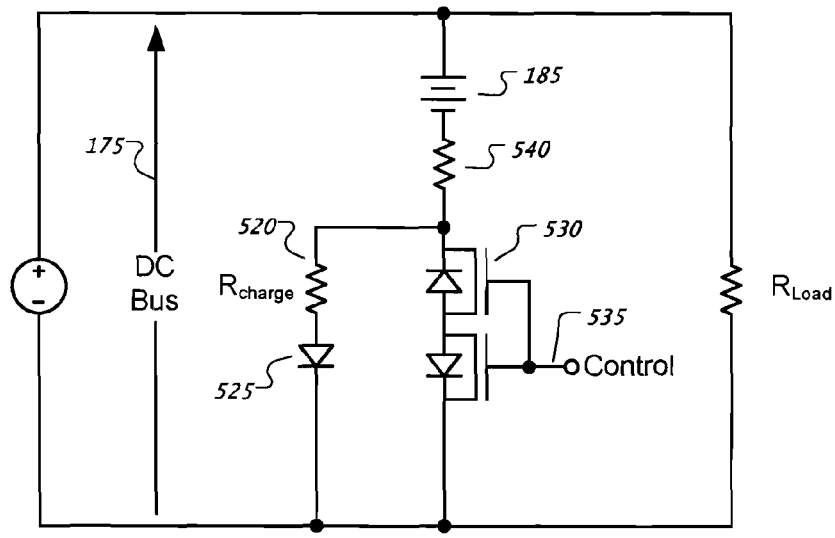

FIGS. 5A-5B are schematic diagrams showing details of a battery circuit in an exemplary power distribution architecture.

FIG. 5A shows an exemplary schematic 500 for a portion of the charge/discharge control circuit 305, which is described with reference to FIG. 3. The schematic 500 includes a comparator circuit 505 to toggle a signal Vups when the voltage on the DC bus 175 falls below a threshold, Voff. The schematic 500 also includes a comparator circuit 510 to toggle a signal VBatt when the voltage on the DC bus 175 falls below a threshold, Batt_Low. The signals Vups and Vbatt are described in additional detail with reference to FIGS. 7-8.

The schematic 500 further includes an over-current protection element 515, which in this example includes a fuse. One terminal of the fuse 515 connects to a positive terminal of the battery, and the other terminal connects to a positive rail of the DC bus 175. In other examples, additional series and/or shunt devices to provide over-current, over-voltage, reverse protection, EMI mitigation, and/or other functions.

In the depicted embodiment, a pair of terminals (+Battery, −Battery) is connectable to a battery. The negative battery terminal (−Battery), connects to two parallel paths, each of which is controllable by operation of a switch. One of the parallel paths connects the negative battery terminal to a negative rail of the DC bus 175 through a resistor 520 and a switch 525. This path permits a charging current to flow when the switch is closed. The amplitude of the charging current is substantially limited by the value of the resistance 520 and the difference between the voltage on the DC bus 175 and the battery (not shown). The internal resistance of the battery is typically much less than the value of the resistance 520. In some applications, the voltage drop across the resistance 520 may be used to measure and/or control the charging current.

The other parallel path connects the negative battery terminal to a negative rail of the DC bus 175 through a switch 530. When the switch 530 is closed, the battery is operatively connected across the DC bus 175. In this state, the battery can discharge and supply operating power to any DC loads (not shown) that are also connected across the DC bus 175.

The switches 525, 530 may be passive and/or actively controlled. An exemplary embodiment, shown in FIG. 5B, is illustrative of one implementation, and is not to be taken as limiting.

In FIG. 5B, the battery 185 is modeled with a series resistance 540 that may represent internal and/or contact resistance, for example. The ideal switch 525 (FIG. 5A) for charging the battery is implemented as a diode with no active control input. In this implementation, the AC-to-DC converter 170 (not shown) may regulate the DC bus 175 to a voltage that is sufficient to forward bias the diode (switch) 525 over temperatures of interest and to provide a desired charging current. As such, the set point may be at least the maximum charging voltage plus a diode drop voltage.

In the depicted example of FIG. 5B, the battery charging current is determined, at least in part, by a series resistance and a unidirectional current mechanism, such as a diode or other semiconductor switch, for example. In other embodiments, the battery charger may include a series-pass regulator (e.g., low drop out (LDO) linear regulator) or a switch mode power converter (e.g., buck, boost, buck-boost, Cepic, Cuk, flyback, charge pump, or resonant, etc.), either alone or in combination. The battery charge current may be controlled by current mirror techniques, or using current measurement feedback techniques involving current sense resistance or inductive coupling measurement, for example.

The ideal switch 530 (FIG. 5A) for discharging the battery is implemented as a back-to-back MOSFET (metal oxide semiconductor field effect transistor) switch configured to block current in both directions when in a non-conductive state. This switch 530 opens and closes in response to a control signal 535 that may be generated, for example, by the controller 245 (FIG. 3), for example. In various embodiments, the switches 525, 530 may include Schottky diodes, insulated gate bipolar transistors (IGBTs), or other semiconductor or electro-mechanical switches (e.g., relays).

Figure 6A:
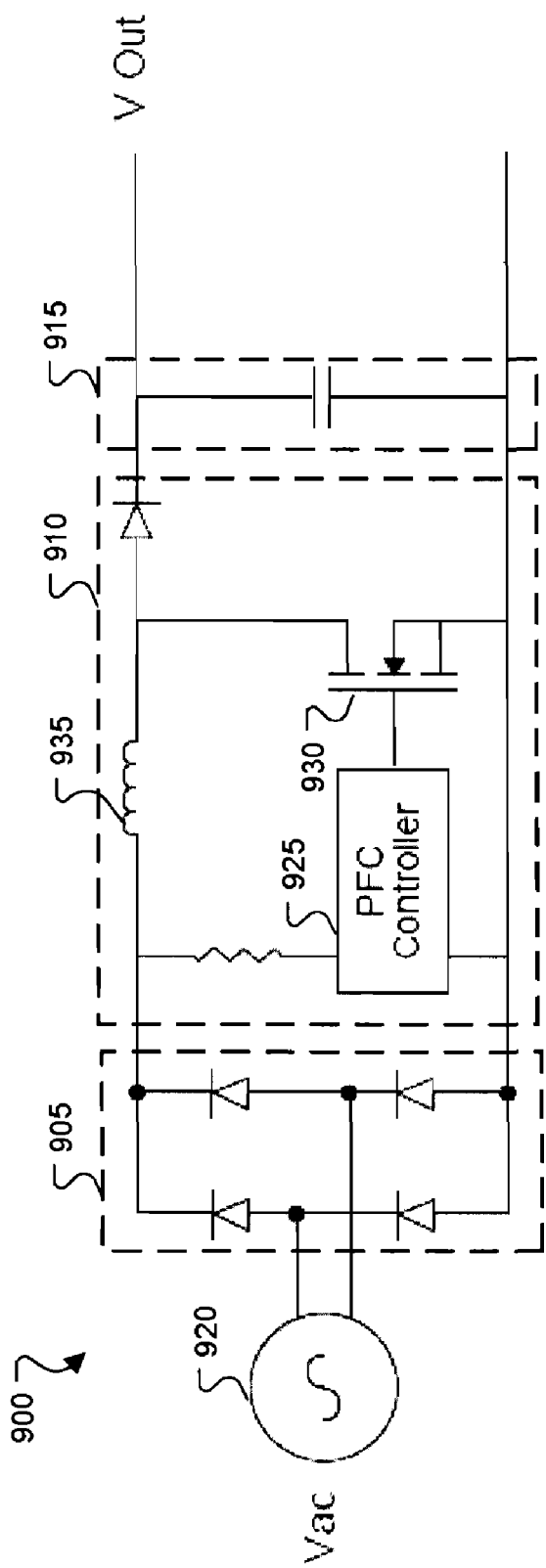
FIGS. 6A-6B are schematic diagrams showing exemplary power factor correction circuits.
Figure 6B:
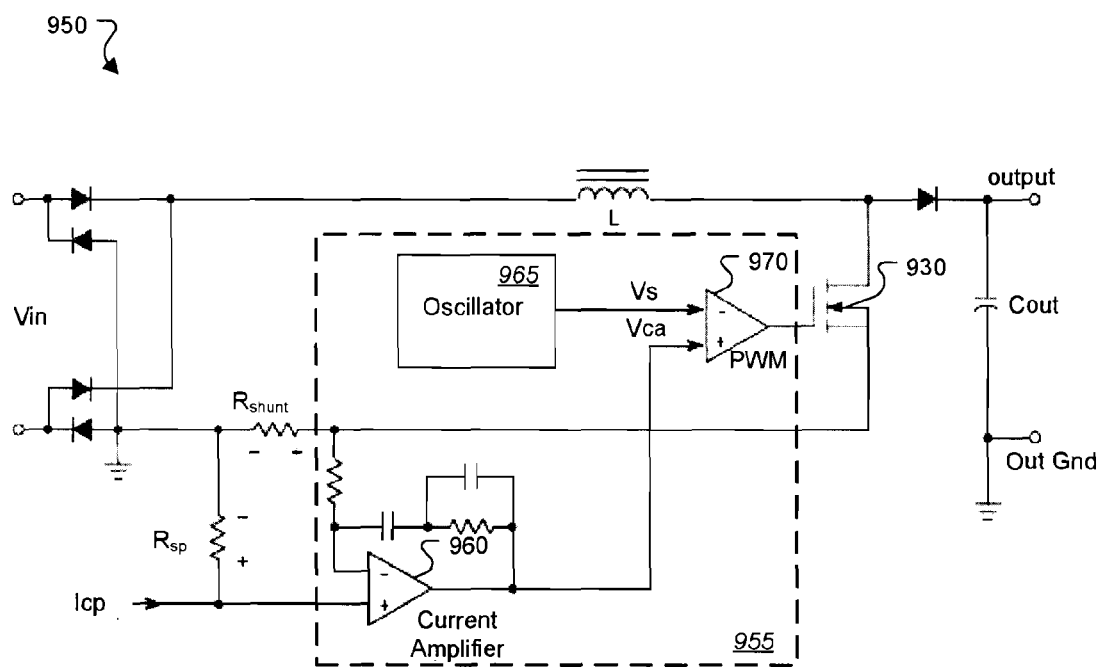

FIGS. 6A-6B show some examples of PFC boost circuits 900, 950 employed in AC-to-DC converter 170 to receive the substantially unconditioned AC input power. For example, circuits 900, 950 may filter noise and harmonic contents in substantially unconditioned AC input power. In another example, the circuits 900, 950 may correct a power factor of the input AC power to a power factor close to unity. In certain implementations, the PFC boost circuits 900, 950 may improve the stability and efficiency of the data center 105 and the transmission system 195. In some examples, the AC-to-DC converter 170 may tolerate line noise from the input AC power and filter noise generated by the DC load 230 from the return power.

While two PFC boost circuits are shown, any suitable PFC circuits may be employed. For higher power circuits, (for example, above 200 W) the traditional topology of choice is the boost converter operating in continuous conduction mode (CCM) and with average current mode control (ACMC). For lower power applications, typically the critical conduction mode (CRM) boost topology is typically employed. In some implementations, other types of switching converter circuits, such as buck, buck-boost, or flyback converter circuits can be used in place of the boost converter to perform power factor correction. In some implementations, a passive PFC circuit may be used to perform power factor correction. For example, a DC filter inductor may be used to reduce harmonic components in the input AC power and improve power factor. Construction of these various circuits are well known in the art.

As shown in FIG. 6A, the PFC boost circuit 900 includes a rectifying stage 905, a switching converter circuit 910, and an output stage 915. As shown, the rectifying stage 905 receives the unconditioned AC power from an AC power source 920. In one example, the AC power source may be the AC switchgear 220. In some examples, an output of the rectifying stage 905 may be a rectified DC power signal.

The switching converter circuit 910 is coupled to the output of the rectifying stage 905. In some implementations, the switching converter circuit 910 operates with a switching frequency higher than the frequency of the AC power source 920. In some examples, the switching converter circuit 910 may behave as an ideal resistive load for the output of the rectifying stage 905. For example, the switching converter 905 may eliminate line current harmonics.

The switching converter circuit 910 includes a PFC controller 925, a switch 930, and an inductor 935. The PFC controller 925 may be an application specific integrated circuit (ASIC) chip or a circuit including both discrete and integrated components. In one implementation, the PFC controller 925 may receive a rectified output of the rectifying stage 905 and a feedback signal from the output stage 915. Using the received inputs, the PFC controller 925 may control the switching converter circuit 910 to maintain an input current shape and control the input current to be in phase with the input AC voltage.

In some examples, the PFC controller 925 may include a multiplier circuit and a pulse width modulation (PWM) circuit. For example, the multiplier circuit may receive a current reference and an input voltage reference from the rectified output of the rectifying stage 905. Using the feedback signal, the PFC controller 925 may sense a variation between the output voltage and a reference DC voltage. In some implementations, the reference DC voltage may be supplied by the battery 185. In one example, the multiplier circuit may use the sensed variation, the phase of the input current, and the input AC voltage to determine a control signal. The PWM circuit compares the control signal with the input current to generate a switching signal to control the switch 930. For example, the switching signal may control the current amplitude flowing in the inductor 935 and maintain a constant output voltage at Vout. For example, the output voltage may be 280 VDC.

As shown in FIG. 6B, the PFC boost circuit 950 performs power factor correction by matching an average input current to a reference current. The PFC boost circuit 950 includes an average input current mode controller 955. The controller 955 regulates the average current based on a control signal Icp. In one implementation, Icp may be generated by a low frequency DC loop error amplifier. For example, Icp may be generated by comparing the output DC voltage with a reference voltage.

As shown, the controller 955 includes a current amplifier 960, an oscillator 965, and a PWM comparator 970. In some implementations, the current amplifier 950 may be an integrator of the current signals. IN some examples, the output of the current amplifier 950 may be a low frequency error signal based on the average current in through the shunt resistor Rshunt and the Icp signal.

In the depicted example, the error signal is compared with a waveform generated by the oscillator 965. For example, the waveform may be a sawtooth waveform, a sinusoidal waveform, or other periodic waveforms. Based on the difference between the generated waveform and the error signal, the PWM comparator 970 may generate a duty cycle signal to the switch 930. For example, the PWM comparator 970 can use the duty cycle signal to control an output voltage at output and a shape of the input current to match the phase of the input voltage.

In some implementations, a PFC boost circuit may include two cascaded power stages. For example, a first stage of the PFC boost circuit may include a boost converter to control input current waveform and maintain near unity power factor. For example, a second stage may include a second switching converter to convert the output voltage from the first stage into various DC voltage levels (e.g., 3.3 V, 5 V, 12 V, etc.) for the DC loads 230 of the tray 110. In some implementations, the second stage of the PFC boost circuit may be implemented on the motherboard 120.

Figure 7:
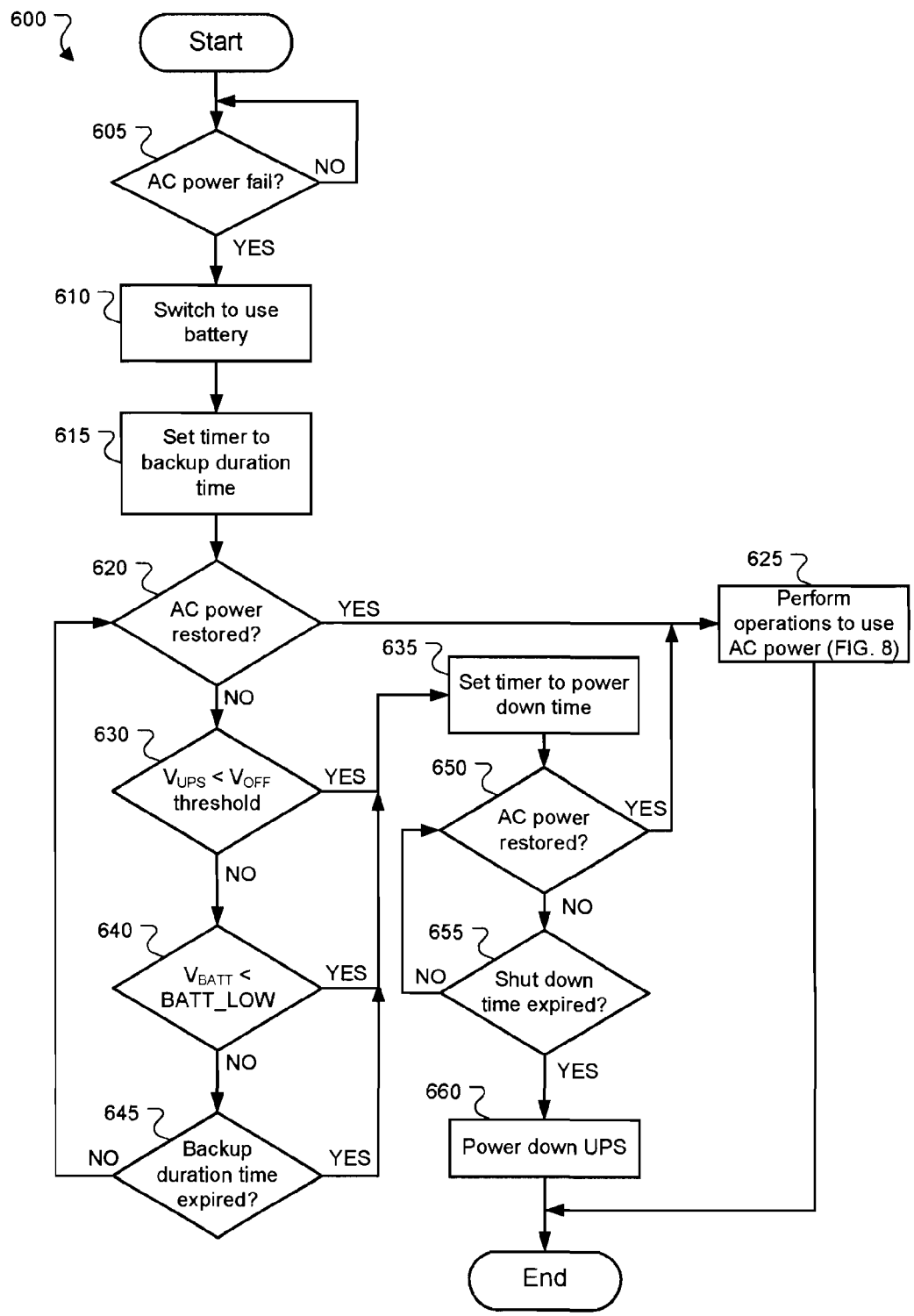
FIGS. 7-8 are flow diagrams illustrating exemplary methods that may be performed in embodiments of the power distribution architecture. Like reference symbols in the various drawings indicate like elements.
Figure 8:
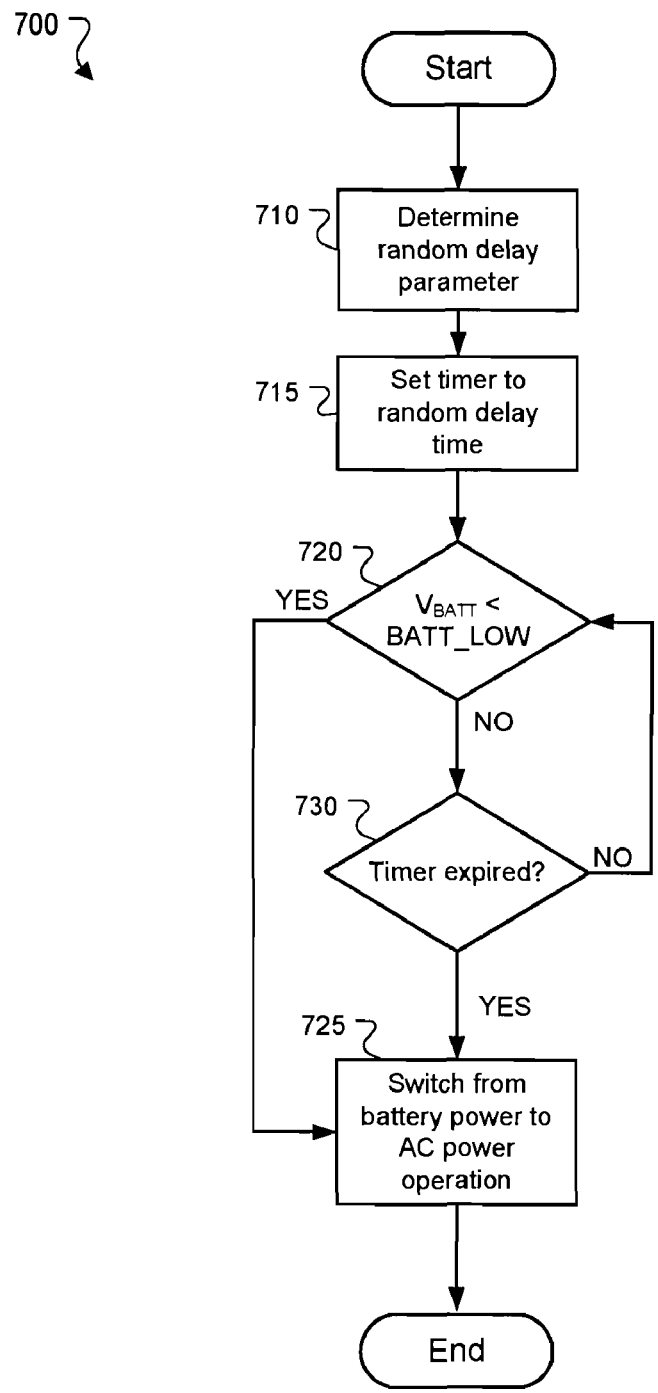

FIGS. 7-8 are flow diagrams illustrating exemplary methods that may be performed in embodiments of the power distribution architecture.

Referring to FIG. 7, a flowchart 600 illustrates an exemplary method that the UPS 115 may perform to handle a fault condition on the AC input voltage signal. In some embodiments, the UPS 115 may perform the method to coordinate switchover to and/or from the battery as a temporary power source. In some cases, performing the method may substantially reduce and/or prevent performance disruptions (e.g., data errors) as a consequence of the AC fault condition. For example, the battery 185 may provide sufficient operating power to maintain operation of the DC loads 230 until an AC source, such as the utility mains 205 or backup generators 210, 215, can be brought on-line. In some embodiments, the battery 185 may continue to provide operating power while the DC loads 230 execute instructions to perform graceful power-down operations. Such graceful shutdown operations can vary widely, but generally attempt to mitigate performance disruptions that could result from the fault condition. Such disruptions may, for example, manifest themselves as stale data when the processing system is subsequently restarted.

Generally, the method includes operations that may be performed by a controller (e.g., the controller 245). The operations may further be performed under the control, supervision, and/or monitoring of one or more of the processors 160 in the system 100. Operations may also be supplemented or augmented by other processing and/or control elements that may be in operative communication with the controller through a network connection 140 coupled to the tray 110. Some or all of the operations may be performed by one or more processors executing instructions tangibly embodied in a signal. The processing may be implemented using analog and/or digital hardware or techniques, either alone or in cooperation with one or more processors executing instructions.

The method begins at step 605 when the controller determines that there is a fault on the AC input voltage signal. For example, the controller may identify the occurrence of AC power failures by monitoring, for example, the AC bus 225, a voltage status condition signal provided by a voltage monitoring/fault detection circuit on the tray 110, and/or an output voltage (e.g., VUPS in FIG. 5A) at the DC bus 175.

In some embodiments, the UPS 115 may include an analog to digital converter that converts VUPS into a digital value (e.g., a 10 bit digital value). When the controller detects that a key voltage drops below a threshold, the controller may initiate an AC power fault routine. In other embodiments, the controller may receive signals from an external component, such as a power combiner in the AC switchgear 220. Such signals may indicate a failure in the AC input voltage signal. In other embodiments, the AC-to-DC converter 170 may send a message to the controller to indicate an AC power fault.

If the controller determines that the AC power is not faulted, then step 605 is repeated. If the controller determines that the AC power is in a fault condition, then, in step 610, the controller switches the UPS 115 from AC operation to battery operation. For example, the controller may send signals to open the switch 525 and to close the switch 530 (FIG. 5A) to operatively connect the battery 185 across the DC bus 175 such that the battery 185 can support the DC loads 230. Next, in step 615, the controller sets a timer to a backup duration time. The timer may be a register in the controller to decrement or increment as time advances. In some embodiments, the backup duration time may represent a duration that the battery power may be used or relied upon. For example, the controller may compute the backup duration time using an estimate of an expected battery life, less the time required for the DC loads 230 to perform graceful power down operations. In other embodiments, the controller may load the backup duration time from the NVM 310.

In step 620, the controller determines whether the AC power is restored. For example, the controller may receive a message from the AC-to-DC converter about the present status of the AC input power. As another example, the controller may poll the AC-to-DC converter to determine whether the AC power is restored. If the controller determines that the AC power is restored, then the controller may perform operations in step 625 to switch back to operating from AC power, and the method 600 then ends. An exemplary method for switching from battery power to AC power is described in further detail with reference to FIG. 8.

If, at step 620, the controller determines that the AC power is not restored, then in step 630 the controller checks whether VUPS is less than a minimum voltage for battery backup (VOFF). If the controller determines that VUPS is less than VOFF, then the controller may set the timer to a power down time in step 630. For example, the power down time may be an estimation of the time required for the DC loads to perform the power down operations. In some examples, the power down operations of the DC loads may prevent data loss and/or avoid damage due to sudden loss of DC power. If, in step 630, the controller determines that VUPS is not less than VOFF, then, in step 640, the controller may determine whether an output voltage of the battery (VBATT) is less than a battery low threshold (BATT_LOW). In some embodiments, when VBATT is lower than BATT_LOW, it may indicate that the power stored in the batter is low and proper power down operations may be executed to prevent data loss, for example. If the controller determines that VBATT is less than BATT_LOW, then the step 635 is performed. If the controller determines that VBATT is not less than BATT_LOW, then the controller may check whether the backup duration time is expired. If the controller determines that the backup duration time is expired, then the step 635 is performed. If the controller determines that the backup duration time is not expired, then the step 620 is repeated.

After the controller sets the timer to the power down time in step 635, the controller may check whether the AC power is restored in step 650. If the controller determines that the AC power is restored, then the step 625 is performed. If the controller determines that the AC power is not restored, then the controller determines whether the power down time is expired in step 655. If the controller determines that the power down time is not expired, then the step 650 is repeated. If the controller determines that the power down time is expired, then the controller may, in step 660, power down the UPS (e.g., open the switch 530 in FIG. 5) and the method ends.

FIG. 8 shows a flow chart that illustrates an exemplary method 700 of operations for switching from battery backup power to AC input power. For example, a controller may switch from battery operation to AC operation after AC power is restored after an AC power failure (e.g., see step 625 of FIG. 7), or after a maintenance operation (e.g., a battery test operation).

In some embodiments, the controller may delay the transfer from battery power operation to AC power operation to mitigate, for example, high peak (e.g., inrush) currents into the data center 105. A small fixed delay may further be provided to ensure that the AC input voltage is stable.

As described with reference to step 625 (FIG. 7), the method 700 may begin when the controller determines that the AC input power is restored. First, in step 710, the controller may determine a random delay parameter. For example, a random delay parameter may be stored in the NVM 310 that represents a length of time (e.g., time, clock cycles) to delay (e.g., 1 ms, 0.5 ms, 0.025 ms, etc.) before switching to AC powered operation.

In some embodiments, the random delay parameter may be randomly or pseudo-randomly determined. For example, the controller may generate a pseudo-random delay parameter using a seed (e.g., a serial number stored in a memory register on the UPS 115 and/or the motherboard 120, a machine time when the tray is first started-up, etc.). The delay parameter may then be used by the controller 245 and/or stored in the NVM 310. In another example, the delay parameter may be a random number (e.g., recorded from a physical process such as radioactive decay) that is stored in the NVM 310 during manufacturing process of the UPS 115.

In one embodiment, the controller sets a timer to the random delay at step 715. In other embodiments, the controller may monitor the delay using a counter, a real time clock, an analog ramp or decay circuit with a threshold comparator, or other suitable delay device. Then, the controller determines, in step 720, whether VBATT is less than BATT_LOW. If VBATT is less than BATT_LOW, indicating that the battery is running out of charge, then the controller may switch from battery power to AC power in step 725 and the method 700 ends. For example, the controller may switch off battery power by opening the switch 530 in the circuit 500 (FIG. 5A). In the exemplary data center 105, it is unlikely that all the batteries will reach a discharge limit at the same time, so this method is not expected to substantially increase peak currents on the AC input voltage lines in most embodiments.

If VBATT is not less than BATT_LOW in step 725, then, in step 730, the controller checks whether the timer has expired. If the specified delay is not reached, then the step 725 is repeated. If the specified delay is reached, then the step 720 is repeated and the method 700 ends.

In various embodiments, the battery voltage may be above and/or below the regulated voltage on the DC bus. In some embodiments, the AC-to-DC converter may regulate to a set point voltage that is within 50, 100, 200, 250, 400, 500, . . . , 1000 mV of the battery's nominal fully charged voltage. In various implementations, the regulation set point may be dynamically determined, for example, based on battery characteristics, such as the age, usage history, temperature, internal resistance, charge time response, discharge time response, or other battery circuit-related characteristics. If the battery voltage is above the set-point voltage, then the charger may include a step-up and/or buck-boost type converter circuit.

In some embodiments, a tray 110 may be a modular support structure configured to be mounted in one of a number of locations, slots, or positions in the rack 125. Each tray 120 may include a substrate, such as a printed circuit board (PCB), on which the UPS 175 and the motherboard 120 and/or other DC loads 230 may be integrated. The trays 110 may provide features for a thermal management system, including ports for air flow, when installed in one of the racks 125.

The term "tray" is not intended to refer to a particular arrangement, but instead refers to any arrangement of computer-related components coupled together to serve a particular purpose, such as on a motherboard. Trays may be generally mounted parallel to other trays in a horizontal or vertical stack, so as to permit denser packing than would otherwise be possible with computers having free-standing housings and other components. The term "blade" may also be employed to refer to such apparatuses. Trays may be implemented in particular configurations, including as computer servers, switches (e.g., electrical and optical), routers, drives or groups of drives, and other computing-related devices.

Embodiments of the UPS 115 may be configured to accept various primary or secondary battery technologies. Technologies may include, but are not limited to sealed lead acid, nickel metal hydride, nickel cadmium, wire wound lead acid, alkaline, and lithium ion. The UPS 115 may include circuitry to auto-detect battery chemistry, and adapt charging and discharge profile information according to the determined battery characteristics. In some embodiments, the set point to which the AC-to-DC converter 170 regulates the DC bus 175 may be responsive to the auto-detected battery characteristics. In various embodiments, the battery voltage may be between about 8 Volts and about 26 Volts, such as about 9, 10, 11, 12, 13, . . . , 23, 24, or 25 Volts.

For example, a nominal 12 Volt lead acid battery may have a corresponding set point regulation on the DC bus of about 13.65 Volts, for example, to provide for substantially fully charging the battery. In the event of a switchover from 13.65 Volts regulation on the DC bus to battery voltage, the transient step (in this case, a drop) in voltage on the input to the DC load will be relatively small, such as less than 1 Volt, for example. Such a small change in the input voltage may substantially mitigate adverse transients in the DC loads.

The battery 185 may be a single cell, or a combination of cells arranged in series and/or parallel. In some embodiments, one or more batteries in a UPS may be hot swappable in modes other than battery back-up mode in which the battery is discharging into the load during a fault condition on the AC bus 225. A visual or audible indicator may be provided to alert service personnel whether the battery may be hot swapped.

When mounted on a tray 110, a battery may be located and supported for quick and convenient replacement. Various quick connect/quick disconnect wire harnesses (e.g., Fast-on style connectors), spring-biased electrical contacts, snap features, locking tabs, or the like may be employed to retain batteries for secure connection and quick replacement.

AC mains voltage, as used herein, may refer to AC voltage sources that typically have a fundamental frequency between about 47 Hz and about 500 Hz, without being necessarily so limited. Sources of AC voltage may be derived from stationary or mobile sources, examples of which may include rotating electric generators on transport vehicles, trucks, trains, ships, aircraft, or the like. Rotating generators refer to sources of electric power that substantially derive from coupling a time-varying magnetic field to one or more conductors to produce a substantially sinusoidal voltage. In some implementations, a magnetic field is rotated relative to one or more conductive windings. In some other implementations, one or more conductive windings are rotated relative to a stationary magnetic field.

The AC-to-DC converter 170, being the only AC-to-DC rectification in the power path from the AC generator to the DC load 230, may include features to reduce harmonic distortion, mitigate conducted emissions, manage inrush current, and the like. Accordingly, the converter 170 may incorporate hardware, software, or a combination thereof, to provide power factor correction, spread spectrum (e.g., frequency hopping) switching frequency, filtering, and/or current controlled start-up, for example.

Regulation of the DC bus voltage output by the converter 170 may be accomplished by employing any suitable switching converter and control strategy for providing the single output voltage at a determined set point. Switching topologies may include, but are not limited to, forward, flyback, Cuk, SEPIC, buck, buck-boost, or any suitable resonant or quasi-resonant AC-to-DC converter. In one illustrative embodiment, the AC-to-DC rectification and conversion is accomplished, at least in part, with appropriate operation of an active switching matrix having four controllable switches that modulate the AC input voltage applied to an inductive element in a buck arrangement.

In another illustrative embodiment, the AC input voltage is rectified by an uncontrolled diode rectifier stage, followed by a magnetically coupled DC-to-DC conversion stage using a forward or flyback topology, for example. In yet another illustrative example, a power factor input stage is followed by one or more cascaded step-down DC-to-DC converter stages to yield the regulated voltage at the determined set point. Linear regulation may be used in combination with switch-mode power conversion. From this disclosure, one of ordinary skill in the art will recognize a number of implementations for the AC-to-DC converter 170. Suitable converters are known in the art and vary by application. Two converter designs are described with respect to FIGS. 6A and 6B, for example purposes only.

With reference for example to FIG. 4 as an illustrative example, some embodiments of the system 400 may operate in any of at least four modes. In a first mode, the processing unit 405 is shut down, as is the UPS 115. In a second mode, the battery 185 is charged using power received from the DC bus 175. In this second mode, the battery 185 may fast charge or trickle charge according to a charging algorithm. In a third mode, the battery is "floated" being effectively disconnected from the DC bus and neither charging nor discharging while the AC-to-DC converter supplies operating power to the DC load 230. In a fourth mode, the battery is operatively connected to the DC bus 175, and discharges to supply operating power to the DC loads 230. This fourth condition may be initiated in response to a fault condition on the AC bus 225.

In various implementations, transfers between voltage sources may involve certain transition sequences. The AC switchgear 220 (FIG. 2), for example, may transfer between any of the generators 205, 210, 215 using either a substantially make-before-break or a substantially break-before-make transfer sequence. When switching from AC input operation to battery operation, the UPS 115 may, in some embodiments, disable operation of the AC-to-DC converter before, substantially during, or after the battery 185 is connected across the DC bus 175. If all the converter 175 output current passes through a series diode, for example, then the converter 175 may be disabled by simply disabling operation of the DC-to-DC switching at the switch-mode controller (not shown). In other embodiments, the output may be actively disconnected by a semiconductor switch, for example.

A number of embodiments have been described. Nevertheless, it will be understood that various modifications may be made without departing from the spirit and scope of what is described. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A power distribution system for a data center, the system comprising:
   a power source configured to provide AC power received from an electric utility grid;
   multiple rack mountable processing units, wherein each rack mountable processing unit is mounted in a position in a rack and is coupled to the power source to receive the provided AC power from the power source without any intermediary AC/DC conversion or conditioning of the AC power, each of the rack mountable processing units comprising:
      a DC load comprising at least one digital processor operative to process data received over a network;
      a DC bus configured to deliver operating power to the DC load; and
      an uninterruptible power supply (UPS), the UPS comprising:
         a battery circuit configured to operatively connect a battery across the DC bus during a fault condition in which the AC power falls outside of a normal operating range, wherein the AC input voltage signal originates at a rotating AC generator;
         an AC-to-DC rectification stage comprising an AC-to-DC conversion circuit configured to filter noise and harmonic components from the received AC power, correct a power factor of the received AC power to a power factor closer to unity, and to convert the filtered and corrected AC power to a single DC output voltage signal across the DC bus when the received AC power is within the normal operating range, wherein the AC-to-DC conversion circuit is configured to regulate the DC output voltage signal to a voltage level above and substantially near a maximum nominal charge voltage of the battery; and
         a controller configured to selectively activate the battery circuit and the AC-to-DC conversion circuit such that the battery is operatively connected across the DC bus during the fault condition instead of the DC output voltage signal, and the AC-to-DC conversion circuit resumes supplying the DC output voltage signal across the DC bus when the AC power has returned to the normal operating range.

2. The system of claim 1, wherein the controller is configured to control a switch to selectively connect the battery across the DC bus.

3. The system of claim 1, wherein the battery comprises one or more cells electrically connected in series.

4. The system of claim 1, wherein the battery comprises one or more cells electrically connected in parallel.

5. The system of claim 1, wherein the AC power received from the electric utility grid comprises a phase voltage signal and a neutral signal from a three phase AC system.

6. The system of claim 1, wherein the AC power received from the electric utility grid has an r.m.s. value of about 208 Volts to about 277 Volts.

7. The system of claim 1, wherein the AC power received from the electric utility grid has an r.m.s. value between about 85 Volts and at least about 480 Volts.

8. The system of claim 1, wherein the AC power received from an electric utility grid substantially comprises a sinusoidal waveform at frequency of between about 45 Hz and at least about 500 Hertz.

9. The system of claim 1, wherein a cell in the battery comprises a battery chemistry selected from the group consisting of: lead acid; nickel metal hydride; nickel cadmium; alkaline; and, lithium ion.

10. The system of claim 1, further comprising a charger configured to charge the battery through a path connected across the DC bus.

11. The system of claim 1, wherein the single DC output voltage signal is less than about 26 Volts.

12. The system of claim 1, wherein the single DC output voltage signal is between about 10 Volts and about 15 Volts.

13. The system of claim 1, wherein the single DC output voltage signal is about 13.65 Volts.

14. The system of claim 1, wherein the AC-to-DC conversion circuit regulates the DC output voltage signal to approximately 1 Volt above the maximum nominal charge voltage of the battery.

15. The system of claim 1, wherein the DC output voltage signal provides sufficient voltage for a linear regulator connected in series with the battery across the DC bus to trickle charge the battery to a fully charged state.

16. The system of claim 1, wherein the DC bus comprises a first electrical path at a first voltage, and further comprises a second electrical path at a second voltage.

17. The system of claim 16, wherein one of the first or second voltages is substantially at a ground reference potential.

18. The system of claim 1, wherein a first terminal of the battery is connected directly to a first rail of the DC bus, and the second terminal of the battery is selectively connected to a second rail of the DC bus.

19. The system of claim 1, wherein each rack mountable processing unit further comprises a data store storing a delay time parameter, wherein the controller is configured to selectively activate the AC-to-DC conversion circuit to resume supplying operating power to the DC load a delay time after the controller receives the signal indicative of the removal of the fault in the AC voltage input signal, said delay time corresponding to the delay time parameter in the data store, wherein delay times associated with at least some of the rack mountable processing units are different from one another such that inrush currents into the data center are mitigated.

20. The system of claim 19, wherein the controller is configured to determine the stored delay time parameter.

21. The system of claim 19, wherein the stored delay time parameter comprises a pseudo-randomly generated value.

22. The system of claim 1, wherein the DC load comprises at least one member of the group consisting of: a central processing unit; a data storage device; a math coprocessor; and, a digital signal processor.

23. The system of claim 22, further comprising at least one DC-DC converter configured to convert a voltage supplied on the DC bus to at least one further DC voltage.

24. The system of claim 23, wherein one or more of the at least one further DC voltage is approximately the voltage of a member of the group consisting of: −5; 1; 3; 3.3; 5; 7.5; 10; about 18-20; and, about 20-26 Volts.

25. The system of claim 23, wherein the one or more of the at least one DC-DC converters is configured to filter noise from the voltage supplied on the DC bus.

26. The system of claim 1, wherein the DC load further comprises one or more information-containing signals transmitted to a load external to the DC load.

27. The system of claim 1, wherein the controller is configured to selectively activate the battery circuit and the AC-to-DC conversion circuit such that the AC-to-DC conversion circuit resumes supplying the DC output voltage signal across the DC bus in response to a signal that indicates that the received AC power has returned to the normal operating range.

28. A system comprising:
multiple rack mountable processing units, wherein each rack mountable processing unit is mounted in a position in a rack and is coupled to a power source configured to receive AC power from an electric utility grid and to provide the received AC power to the rack mountable processing units without any intermediary AC/DC conversion or conditioning of the AC power, each of the rack mountable processing units comprising:
a motherboard including at least one digital processor operative to process data received over a network;
a DC bus configured to deliver operating power to the motherboard; and
an uninterruptible power supply (UPS), the UPS comprising:
a battery circuit configured to operatively connect a battery across the DC bus during a fault condition in which the AC power falls outside of a normal operating range;
an AC-to-DC rectification stage comprising an AC-to-DC conversion circuit configured to filter noise and harmonic components from the received AC power, correct a power factor of the received AC power to a power factor closer to unity, and to convert the filtered and corrected AC power to a single DC output voltage signal across the DC bus when the received AC power is within the normal operating range, wherein the AC-to-DC conversion circuit is configured to regulate the DC output voltage signal to a voltage level above and substantially near a maximum nominal charge voltage of the battery; and
a controller configured to selectively activate the battery circuit and the AC-to-DC conversion circuit such that the battery is operatively connected across the DC bus during the fault condition instead of the DC output voltage signal, and the AC-to-DC conversion circuit resumes supplying the DC output voltage signal across the DC bus when the AC input voltage signal has returned to the normal operating range.

29. The DC load of claim 28, further comprising at least one point-of-load DC-DC converter on the motherboard, configured to receive DC voltage from the DC bus and provide conditioned DC voltage to an operating circuit on the motherboard.

30. The DC load of claim 28 wherein the AC-to-DC conversion circuit is of a continuous conduction mode (CCM) type including average current mode control (ACMC).

31. The DC load of claim 28 wherein the AC-to-DC conversion circuit is of a critical conduction mode (CRM) type.

32. The system of claim 28, wherein the controller is configured to control a switch to selectively connect the battery across the DC bus.

33. The system of claim 28, wherein the single DC output voltage signal is less than about 26 Volts.

34. The system of claim 28, wherein the single DC output voltage signal is between about 10 Volts and about 15 Volts.

35. The system of claim 28, wherein the single DC output voltage signal is about 13.65 Volts.

36. The system of claim 28, wherein the AC-to-DC conversion circuit regulates the DC output voltage signal to approximately 1 Volt above the maximum nominal charge voltage of the battery.

37. The system of claim 28, wherein the DC output voltage signal provides sufficient voltage for a linear regulator connected in series with the battery across the DC bus to trickle charge the battery to a fully charged state.

38. The system of claim 28, wherein the DC bus comprises a first electrical path at a first voltage, and further comprises a second electrical path at a second voltage.

39. The system of claim 38, wherein one of the first and second voltages is substantially at a ground reference potential.

40. The system of claim 28, wherein each rack mountable processing unit further comprises a data store storing a delay time parameter, wherein the controller is configured to selectively activate the AC-to-DC conversion circuit to resume supplying operating power to the DC load a delay time after the controller receives the signal indicative of the removal of the fault in the AC voltage input signal, said delay time corresponding to the delay time parameter in the data store wherein delay times associated with at least some of the rack mountable processing units are different from one another such that inrush currents into the data center are mitigated.

41. The system of claim 40, wherein the controller is configured to determine the stored delay time parameter.

42. The system of claim 40, wherein the stored delay time parameter comprises a pseudo-randomly generated value.

43. The system of claim 28, wherein the controller is configured to selectively activate the battery circuit and the AC-to-DC conversion circuit such that the AC-to-DC conversion circuit resumes supplying the DC output voltage signal across the DC bus in response to a signal that indicates that the received AC power has returned to the normal operating range.

\* \* \* \* \*